(12) United States Patent
Jang et al.

(10) Patent No.: US 11,520,184 B2
(45) Date of Patent: Dec. 6, 2022

(54) COLOR CONVERSION DISPLAY PANEL AND DISPLAY DEVICE INCLUDING THE SAME

(71) Applicant: Samsung Display Co., Ltd., Yongin-si (KR)

(72) Inventors: Won Woo Jang, Seoul (KR); Jin Ho Park, Suwon-si (KR); Won Sik Oh, Seoul (KR); Hyang-A Park, Seoul (KR); Seung In Baek, Seoul (KR); Seoung Bum Pyoun, Hwaseong-si (KR); Jae Min Ha, Asan-si (KR); Hyun Ji Ha, Suwon-si (KR)

(73) Assignee: Samsung Display Co., Ltd.

( * ) Notice: Subject to any disclaimer, the term of this patent is extended or adjusted under 35 U.S.C. 154(b) by 49 days.

(21) Appl. No.: 15/901,718

(22) Filed: Feb. 21, 2018

(65) Prior Publication Data
US 2019/0064600 A1 Feb. 28, 2019

(30) Foreign Application Priority Data
Aug. 22, 2017 (KR) ........................ 10-2017-0106149

(51) Int. Cl.
*G02F 1/13357* (2006.01)
*G02F 1/1335* (2006.01)
*G02F 1/1368* (2006.01)

(52) U.S. Cl.
CPC .. *G02F 1/133617* (2013.01); *G02F 1/133504* (2013.01); *G02F 1/133514* (2013.01); *G02F 1/1368* (2013.01); *G02F 1/133562* (2021.01); *G02F 2202/108* (2013.01); *G02F 2202/36* (2013.01)

(58) Field of Classification Search
CPC ......... G02F 1/133617; G02F 1/133504; G02F 1/133514; G02F 1/1368; G02F 2001/133562; G02F 2202/108; G02F 2202/36
See application file for complete search history.

(56) References Cited

U.S. PATENT DOCUMENTS

| 9,559,322 B2 | 1/2017 | Ko et al. |
| 10,229,957 B2 | 3/2019 | Rieger et al. |
| 10,545,378 B2 | 1/2020 | Suzuki et al. |

(Continued)

FOREIGN PATENT DOCUMENTS

| CN | 103487857 A | 1/2014 |
| CN | 105759496 A | 7/2016 |

(Continued)

OTHER PUBLICATIONS

Chinese Office Action corresponding to Application No. 201810959230.9 dated Sep. 2, 2022, 7 pages.

*Primary Examiner* — Edward J Glick
*Assistant Examiner* — David Y Chung
(74) *Attorney, Agent, or Firm* — Innovation Counsel LLP

(57) ABSTRACT

A color conversion display panel includes: a color conversion layer provided on a substrate and including a semiconductor nanocrystal and a scatterer; and a transmission layer provided on the substrate, wherein the semiconductor nanocrystal is included at greater than 30 wt % of an entire content of the color conversion layer, and the scatterer is included at equal to or less than 12 wt % of the entire content of the color conversion layer.

25 Claims, 15 Drawing Sheets

(56) References Cited

U.S. PATENT DOCUMENTS

| | | |
|---|---|---|
| 10,551,670 B2 | 2/2020 | Lee et al. |
| 10,712,614 B2 | 7/2020 | Lee et al. |
| 11,187,942 B2 | 11/2021 | Lee et al. |
| 2005/0087132 A1* | 4/2005 | Dickey ............... G02B 5/285 118/715 |
| 2011/0279998 A1* | 11/2011 | Su ..................... H01L 33/46 257/E33.061 |
| 2013/0242228 A1* | 9/2013 | Park ............... G02F 1/133617 349/61 |
| 2013/0335799 A1* | 12/2013 | Yoon ............... G02F 1/133553 359/227 |
| 2014/0160408 A1* | 6/2014 | Cho ............... G02F 1/133617 349/110 |
| 2014/0192294 A1* | 7/2014 | Chen ............... G02F 1/133504 349/69 |
| 2015/0285969 A1* | 10/2015 | Kim ..................... G02B 5/201 359/891 |
| 2015/0323711 A1* | 11/2015 | Bessho ............... G02B 5/0242 349/71 |
| 2017/0059940 A1* | 3/2017 | Kim ............... G02F 1/133617 |
| 2017/0125722 A1* | 5/2017 | Wehlus ............... H01L 51/5275 |
| 2017/0153368 A1* | 6/2017 | Yoon ............... G02F 1/133512 |
| 2017/0222102 A1* | 8/2017 | Cheng ............... H01L 33/483 |
| 2017/0328541 A1* | 11/2017 | Yoneyama ............... F21K 9/64 |
| 2017/0357033 A1* | 12/2017 | Ockenfuss ............ C23C 14/3457 |
| 2017/0362502 A1* | 12/2017 | Lee ..................... H05B 33/20 |
| 2018/0186817 A1* | 7/2018 | Lee ..................... C07F 5/022 |
| 2019/0189698 A1 | 6/2019 | Rieger et al. |

FOREIGN PATENT DOCUMENTS

| | | |
|---|---|---|
| CN | 106556949 A | 4/2017 |
| KR | 10-2016-0001568 | 4/2016 |
| KR | 10-2016-0060904 | 5/2016 |
| KR | 10-2016-0087281 | 8/2017 |
| WO | 2016-124312 A1 | 8/2016 |

* cited by examiner

COLOR CONVERSION DISPLAY PANEL AND DISPLAY DEVICE INCLUDING THE SAME

CROSS-REFERENCE TO RELATED APPLICATION

This application claims priority to and the benefit of Korean Patent Application No. 10-2017-0106149 filed in the Korean Intellectual Property Office on Aug. 22, 2017, the entire contents of which are incorporated herein by reference.

BACKGROUND

(a) Field

The present disclosure relates a color conversion display panel and a display device including the same.

(b) Description of the Related Art

A liquid crystal display used as a display device may include two field generating electrodes, a liquid crystal layer, a color filter, and a polarization layer. Light generated by a light source passes through the liquid crystal layer, the color filter, and the polarization layer to reach a viewer, and the polarization layer and the color filter may cause loss of light. A display device such as an organic light emitting device in addition to the liquid crystal display may generate the loss of light.

Display devices including a color conversion display panel using a semiconductor nanocrystal such as quantum dots have been proposed so as to reduce the loss of light generated on the polarization layer and realize a display device with high color reproducibility.

The above information disclosed in this Background section is only for enhancement of understanding of the background and therefore it may contain information that does not form the prior art that is already known in this country to a person of ordinary skill in the art.

SUMMARY

Embodiments have been made in an effort to provide a color conversion display panel and a display device with improved light outputting efficiency.

An exemplary embodiment provides a color conversion display panel including: a color conversion layer provided on a substrate and including a semiconductor nanocrystal and a scatterer; and a transmission layer provided on the substrate, wherein the semiconductor nanocrystal is included at greater than 30 wt % of an entire content of the color conversion layer, and the scatterer is included at equal to or less than 12 wt % of the entire content of the color conversion layer.

A content of the semiconductor nanocrystal may be 40 wt % to 60 wt % of the entire content of the color conversion layer.

The color conversion layer may include a red color conversion layer and a green color conversion layer, and at least one of the red color conversion layer and the green color conversion layer may include a scattering layer provided on the substrate, and a main color conversion layer overlapping the scattering layer.

The red color conversion layer may include a first scattering layer and a second scattering layer provided on the substrate, and a first main color conversion layer provided between the first scattering layer and the second scattering layer, the first scattering layer and the second scattering layer include the scatterer, and the first main color conversion layer includes the scatterer and a first semiconductor nanocrystal.

The green color conversion layer may include a first scattering layer and a second scattering layer provided on the substrate, and a second main color conversion layer provided between the first scattering layer and the second scattering layer, the first scattering layer and the second scattering layer may include the scatterer, and the second main color conversion layer may include the scatterer and a second semiconductor nanocrystal.

The scattering layer may have a thickness of 1 to 2 μm, and the main color conversion layer may have a thickness of 2 to 4 μm.

The red color conversion layer may include a first main color conversion layer including a first semiconductor nanocrystal and the scatterer, and a first scattering layer provided between the first main color conversion layer and the substrate and including the scatterer, and the green color conversion layer may include a second main color conversion layer including a second semiconductor nanocrystal and the scatterer, and a second scattering layer provided between the second main color conversion layer and the substrate and including the scatterer.

A thickness ratio of the first main color conversion layer and the first scattering layer may be equal to or greater than 1:2 and equal to or less than 2:1, and a thickness ratio of the second main color conversion layer and the second scattering layer may be equal to or greater than 1:2 and equal to or less than 2:1.

The red color conversion layer may include a first main color conversion layer including a first semiconductor nanocrystal and the scatterer, and a first scattering layer provided on the first main color conversion layer and including the scatterer, and the green color conversion layer may include a second main color conversion layer including a second semiconductor nanocrystal and the scatterer, and a second scattering layer provided on the second main color conversion layer and including the scatterer.

A thickness ratio of the first main color conversion layer and the first scattering layer may be equal to or greater than 1:2 and equal to or less than 2:1, and a thickness ratio of the second main color conversion layer and the second scattering layer may be equal to or greater than 1:2 and equal to or less than 2:1.

Another embodiment provides a color conversion display panel including: a red color conversion layer and a green color conversion layer provided on a substrate and including a semiconductor nanocrystal and a scatterer; and a transmission layer provided on the substrate. At least one of the red color conversion layer and the green color conversion layer includes a scattering layer provided on the substrate and including the scatterer, and a main color conversion layer overlapping the scattering layer and including the scatterer and the semiconductor nanocrystal.

The semiconductor nanocrystal may be included at greater than 30 wt % of an entire content of the color conversion layer, and the scatterer may be included at equal to or less than 12 wt % of the entire content of the color conversion layer.

The semiconductor nanocrystal may be included at 40 to 60 wt % of the entire content of the color conversion layer.

The red color conversion layer may include a first scattering layer and a second scattering layer provided on the substrate, and a first main color conversion layer provided on the first scattering layer and the second scattering layer, and the green color conversion layer may include the first scattering layer and the second scattering layer provided on the substrate, and a second main color conversion layer provided on the first scattering layer and the second scattering layer.

Each thickness of the first scattering layer and the second scattering layer may be 1 to 2 μm, and each thickness of the first main color conversion layer and the second main color conversion layer may be 2 to 4 μm.

The red color conversion layer may include a first main color conversion layer including a first semiconductor nanocrystal and the scatterer, and a first scattering layer provided between the first main color conversion layer and the substrate and including the scatterer, and the green color conversion layer may include a second main color conversion layer including a second semiconductor nanocrystal and the scatterer, and a second scattering layer provided between the second main color conversion layer and the substrate and including the scatterer.

A thickness ratio of the first scattering layer and the first main color conversion layer may be equal to or greater than 1:2 and equal to or less than 2:1, and a thickness ratio of the second scattering layer and the second main color conversion layer may be equal to or greater than 1:2 and equal to or less than 2:1.

The red color conversion layer may include a first main color conversion layer including a first semiconductor nanocrystal and the scatterer, and a first scattering layer provided on the first main color conversion layer and including the scatterer, and the green color conversion layer may include a second main color conversion layer including a second semiconductor nanocrystal and the scatterer, and a second scattering layer provided on the second main color conversion layer and including the scatterer.

A thickness ratio of the first main color conversion layer and the first scattering layer may be equal to or greater than 1:2 and equal to or less than 2:1, and a thickness ratio of the second main color conversion layer and the second scattering layer may be equal to or greater than 1:2 and less than 2:1.

Yet another embodiment provides a display device including: a thin film transistor array panel; a color conversion display panel overlapping the thin film transistor array panel; and a liquid crystal layer provided between the thin film transistor array panel and the color conversion display panel. The color conversion display panel includes a color conversion layer provided between a substrate and the liquid crystal layer and including a semiconductor nanocrystal and a scatterer. A transmission layer is provided between the substrate and the liquid crystal layer and includes a scatterer. The semiconductor nanocrystal is included at 40 to 60 wt % of an entire content of the color conversion layer, and the scatterer is included at 12 wt % of the entire content of the color conversion layer.

The color conversion layer may include a red color conversion layer and a green color conversion layer, and at least one of the red color conversion layer and the green color conversion layer may include a scattering layer provided between the substrate and the liquid crystal layer, and a main color conversion layer overlapping the scattering layer.

The red color conversion layer may include a first scattering layer and second scattering layer provided between the substrate and the liquid crystal layer and including the scatterer, and a first main color conversion layer provided between the first scattering layer and the second scattering layer and including the scatterer and a first semiconductor nanocrystal, and the green color conversion layer may include the first scattering layer and the second scattering layer provided between the substrate and the liquid crystal layer and including the scatterer, and a second main color conversion layer provided between the first scattering layer and the second scattering layer and including the scatterer and a second semiconductor nanocrystal.

The red color conversion layer may include a first main color conversion layer including a first semiconductor nanocrystal, and a first scattering layer provided between the first main color conversion layer and the substrate, and the green color conversion layer may include a second main color conversion layer including a second semiconductor nanocrystal, and a second scattering layer provided between the second main color conversion layer and the substrate.

A thickness ratio of the first scattering layer and the first main color conversion layer may be equal to or greater than 1:2 and equal to or less than 2:1, and a thickness ratio of the second scattering layer and the second main color conversion layer may be equal to or greater than 1:2 and equal to or less than 2:1.

The red color conversion layer may include a first main color conversion layer including a first semiconductor nanocrystal and the scatterer, and a first scattering layer provided between the first main color conversion layer and the liquid crystal layer and including the scatterer, and the green color conversion layer may include a second main color conversion layer including a second semiconductor nanocrystal and the scatterer, and a second scattering layer provided between the second main color conversion layer and the liquid crystal layer and including the scatterer.

A thickness ratio of the first main color conversion layer and the first scattering layer may be equal to or greater than 1:2 and equal to or less than 2:1, and a thickness ratio of the second main color conversion layer and the second scattering layer may be equal to or greater than 1:2 and equal to or less than 2:1.

According to the exemplary embodiments, the light outputting efficiency of the color conversion display panel and the display device is improved.

DETAILED DESCRIPTION OF THE EMBODIMENTS

Figure 1:
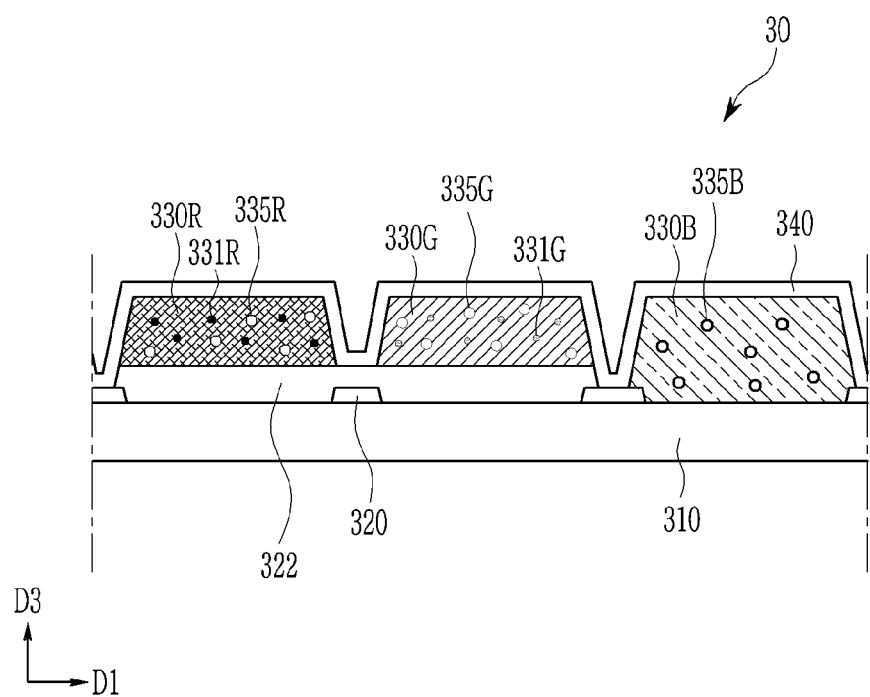
FIG. 1 shows a cross-sectional view of a color conversion display panel according to an exemplary embodiment.

In the following detailed description, only certain exemplary embodiments have been shown and described, simply by way of illustration. As those skilled in the art would realize, the described embodiments may be modified in various different ways, all without departing from the spirit or scope of the inventive concept.

Accordingly, the drawings and description are to be regarded as illustrative in nature and not restrictive, and like reference numerals designate like elements throughout the specification.

The size and thickness of each configuration shown in the drawings are arbitrarily shown for better understanding and ease of description, and the embodiments are not limited thereto. In the drawings, the thickness of layers, films, panels, regions, etc., are exaggerated for clarity. For better understanding and ease of description, the thicknesses of some layers and areas are exaggerated.

It will be understood that when an element such as a layer, film, region, or substrate is referred to as being "on" another element, it can be directly on the other element or intervening elements may also be present. In contrast, when an element is referred to as being "directly on" another element, there are no intervening elements present. The word "on" or "above" means positioned on or above the object portion, and does not necessarily mean positioned on the upper side of the object portion based on a gravitational direction.

Unless explicitly described to the contrary, the word "comprise" and variations such as "comprises" or "comprising" will be understood to imply the inclusion of stated elements but not the exclusion of any other elements.

The phrase "on a plane" means viewing the object portion from the top, and the phrase "on a cross-section" means viewing a cross-section of which the object portion is vertically cut from the side.

A color conversion display panel 30 according to an exemplary embodiment will now be described with reference to FIG. 1. FIG. 1 shows a cross-sectional view of the color conversion display panel 30 according to an exemplary embodiment.

The color conversion display panel 30 includes a light blocking member 320 provided on a substrate 310. The light blocking member 320 may be provided between a red color conversion layer 330R and a green color conversion layer 330G, between a green color conversion layer 330G and a transmission layer 330B and between a transmission layer 330B and another red color conversion layer 330R to be described. The light blocking member 320 may also be provided between adjacent red color conversion layers 330R, between adjacent green color conversion layers 330G, and between adjacent transmission layers 330B. The light blocking member 320 may have a lattice or linear form in a plane view.

The light blocking member 320 may prevent light emitted by respective adjacent pixels from being mixed, and may partition regions in which the red color conversion layer 330R, the green color conversion layer 330G, and the transmission layer 330B are disposed. The light blocking member 320 may use any types of materials for blocking (reflecting or absorbing) light.

A blue light cutting filter 322 is provided on the substrate 310 and the light blocking member 320. The blue light cutting filter 322 may be provided between the red color conversion layer 330R and the substrate 310 and between the green color conversion layer 330G and the substrate 310. In this instance, the blue light cutting filter 322 may overlap the regions emitting the red light and green light and may not overlap the region emitting the blue light. It has been shown in FIG. 1 that the blue light cutting filter 322 is provided over the substrate 310, and without being limited to this, an additional buffer layer may be provided between the substrate 310 and the blue light cutting filter 322.

The blue light cutting filter 322 includes a first region overlapping the red color conversion layer 330R and a second region overlapping the green color conversion layer 330G, and the regions may be connected to each other. However, without being limited to this, the first and second regions may be separated from each other.

The blue light cutting filter 322 may block (absorb or reflect) the blue light supplied by a light unit (not shown) that is not absorbed by the red color conversion layer 330R and the green color conversion layer 330G but passes through the substrate 310 and is then output. The blue light supplied by the light unit may be input to the color conversion display panel 30, it may pass through the color conversion layers 330R and 330G and be converted, or it may pass through the transmission layer 330B, pass through the substrate 310, and be output, with reference to FIG. 1.

The blue light input to the red color conversion layer 330R and the green color conversion layer 330G from a light unit (not shown) in a third direction D3 is converted into the red or green light by semiconductor nanocrystals 331R and 331G, and some blue light that is not converted may be output as it is. In this instance, the blue light that is output as blue and the red or green light that is converted are mixed together so the color reproducibility provided by respective pixels may be deteriorated. The blue light cutting filter 322 may prevent the red light or the green light from being mixed with the blue light by blocking the blue light that is not converted and is output by the red color conversion layer 330R and the green color conversion layer 330G.

The blue light cutting filter 322 may include any kinds of materials for performing the above-described effect, and for example, it may include a yellow color filter. The blue light cutting filter 322 may have a single-layered structure or a multi-layered stacked structure.

A plurality of the color conversion layers 330R and 330G may be provided on the blue light cutting filter 322, and the transmission layer 330B may be provided on the substrate 310 without the blue light cutting filter 322. The color conversion layers 330R and 330G and the transmission layer 330B shown in FIG. 1 may be repeatedly arranged in a first direction D1.

The color conversion layers 330R and 330G may convert incident light into light that has a different wavelength from the incident light and may output resultant light. The color conversion layers 330R and 330G may include the red color conversion layer 330R and the green color conversion layer 330G. The transmission layer 330B may not convert the incident light and may output the same as it is. For example, blue light may be input to the transmission layer 330B, and it may be output therefrom as it is.

The red color conversion layer 330R may include the first semiconductor nanocrystal 331R for converting incident blue light into red light. The first semiconductor nanocrystal 331R may include at least one of a phosphor and a quantum dot.

The first semiconductor nanocrystal 331R may be included at greater than about 30 wt % of an entire content of the red color conversion layer 330R, and desirably, it may have a content of about 40 to 60 wt %. When the content of the first semiconductor nanocrystal 331R is less than about 40 wt %, the efficiency to convert the supplied blue light into red light may be low. When the content of the first semiconductor nanocrystal 331R is greater than about 60 wt %, an appropriate level of the first semiconductor nanocrystal 331R included in the red color conversion layer 330R becomes excessive so the conversion efficiency may be deteriorated.

The green color conversion layer 330G may include the second semiconductor nanocrystal 331G for converting the incident blue light into green light. The second semiconductor nanocrystal 331G may include at least one of a phosphor and a quantum dot.

The second semiconductor nanocrystal 331G may be included at greater than about 30 wt % of the entire content of the green color conversion layer 330G, and desirably, it may have a content of about 40 to 60 wt %. When the content of the second semiconductor nanocrystal 331G is less than about 40 wt %, the efficiency to convert the supplied blue light into green light may be low. When the content of the second semiconductor nanocrystal 331G is greater than about 60 wt %, an appropriate level of the second semiconductor nanocrystal 331G included in the green color conversion layer 330G becomes excessive so the conversion efficiency may be deteriorated.

The quantum dots included in the first semiconductor nanocrystals 331R and the second semiconductor nanocrystal 331G may be independently selected from among a group II-VI compound, a group III-V compound, a group IV-VI compound, a group IV element, a group IV compound, and a combination thereof.

The Group II-VI compound may be selected from among a binary compound selected from among CdSe, CdTe, ZnS, ZnSe, ZnTe, ZnO, HgS, HgSe, HgTe, MgSe, MgS, and a mixture thereof; a tertiary compound selected from among CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS, and a mixture thereof; and a quaternary compound selected from among HgZnTeS, CdZnSeS, CdZnSeTe, CdZnSTe, CdHgSeS, CdHgSeTe, CdHgSTe, HgZnSeS, HgZnSeTe, HgZnSTe, and a mixture thereof. The Group III-V compound may be selected from among a binary compound selected from among GaN, GaP, GaAs, GaSb, AlN, AlP, AlAs, AlSb, InN, InP, InAs, InSb, and a mixture thereof; a tertiary compound selected from among GaNP, GaNAs, GaNSb, GaPAs, GaPSb, AlNP, AlNAs, AlNSb, AlPAs, AlPSb, InNP, InNAs, InNSb, InPAs, InPSb, GaAlNP, and a mixture thereof; and a quaternary compound selected from among GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, InAlPSb, and a mixture thereof. The Group IV-VI compound may be selected from among a binary compound selected from the group consisting of SnS, SnSe, SnTe, PbS, PbSe, PbTe, and a mixture thereof; a tertiary compound selected from among SnSeS, SnSeTe, SnSTe, PbSeS, PbSeTe, PbSTe, SnPbS, SnPbSe, SnPbTe, and a mixture thereof; and a quaternary compound selected from among SnPbSSe, SnPbSeTe, SnPbSTe, and a mixture thereof. The Group IV element may be selected from among Si, Ge, and a mixture thereof. The Group IV compound may be a binary compound selected from among SiC, SiGe, and a mixture thereof.

In this case, the binary compound, the tertiary compound, or the quaternary compound may exist in particles at a uniform concentration, or may exist in the same particle divided into states where concentration distributions partially differ. Further, the color conversion media layer may have a core/shell structure where one quantum dot surrounds another quantum dot. An interface between the core and the shell may have a concentration gradient such that a concentration of an element existing in the shell is gradually reduced nearing the center thereof.

The quantum dot may have a full width at half maximum (FWHM) of an emission wavelength spectrum of about 45 nm or less, suitably about 40 nm or less, and more suitably about 30 nm or less, and in this range, color purity or color reproducibility may be improved. Also, the light emitted through the quantum dot is irradiated in all directions, thereby improving a light viewing angle.

When the first semiconductor nanocrystal 331R includes a red phosphor, the red phosphor may include at least one of (Ca, Sr, Ba)S, $(Ca, Sr, Ba)_2Si_5N_8$, $CaAlSiN_3$, $CaMoO_4$, and $Eu_2Si_5N_8$, and it is not limited thereto.

When the second semiconductor nanocrystal 331G includes a green phosphor, the green phosphor may include at least one of yttrium aluminum garnet (YAG), $(Ca, Sr, Ba)_2SiO_4$, $SrGa_2S_4$, barium magnesium aluminate (BAM), $\alpha$-SiAlON, $\beta$-SiAlON, $Ca_3Sc_2Si_3O_{12}$, $Tb_3Al_5O_{12}$, $BaSiO_4$, CaAlSiON, and $(Sr_{1-x}Ba_x)Si_2O_2N_2$. The x may be a random number between 0 and 1.

The transmission layer 330B may pass through predetermined incident light. The transmission layer 330B may include a resin for allowing blue light to transmit. The transmission layer 330B provided in a region outputting the blue color allows the incident blue color as it is without including an additional semiconductor nanocrystal.

Although not shown, the transmission layer 330B may further include at least one of a dye and a pigment. The transmission layer 330B including a dye or a pigment may reduce reflection of external light and may provide blue light with improved color purity.

At least one of the red color conversion layer 330R, the green color conversion layer 330G, and the transmission layer 330B may further include scatterers 335R, 335G, and 335B. The contents of the respective scatterers 335R, 335G, and 335B included in the red color conversion layer 330R, the green color conversion layer 330G, and the transmission layer 330B may be different.

According to an exemplary embodiment, a content of the scatterer 335R included in the red color conversion layer 330R may be less than about 12 wt % of the entire content of the red color conversion layer 330R. When the content of the scatterer 335R is greater than about 12 wt % of the entire content, an optical amount of the blue light that is scattered and output without color conversion may increase. Accordingly, the light conversion efficiency of the first semiconductor nanocrystal 331R is reduced so the light outputting efficiency and the color reproducibility may be reduced.

Similarly, a content of the scatterer 335G included in the green color conversion layer 330G may be less than about 12 wt % of the entire content of the green color conversion layer 330G. When the content of the scatterer 335G is greater than about 12 wt % of the entire content, an optical amount of the blue light that is scattered and output without color conversion may increase. Accordingly, the light conversion efficiency of the second semiconductor nanocrystal 331G is reduced so the light outputting efficiency and the color reproducibility may be reduced.

The scatterer 335B included in the transmission layer 330B may scatter the light input to the transmission layer 330B to increase the amount of light transmitting through the transmission layer 330B or make front luminance and lateral luminance uniform.

The scatterers 335R, 335G, and 335B may include any kinds of materials for uniformly scattering the incident light. For example, the scatterers 335R, 335G, and 335B may include at least one of $TiO_2$, $ZrO_2$, $Al_2O_3$, $In_2O_3$, ZnO, $SnO_2$, $Sb_2O_3$, and ITO.

For example, the red color conversion layer 330R, the green color conversion layer 330G, and the transmission layer 330B may include a photosensitive resin and may be manufactured through a photolithography process. In another embodiment, they may be manufactured through a printing process or an Inkjet process, and in the case of using the noted process, the red color conversion layer 330R, the green color conversion layer 330G, and the transmission layer 330B may not include a photosensitive resin but another material. The present specification has described the color conversion layer and the transmission layer manufactured by the photolithography process, the printing process, or the Inkjet process, but it is not limited thereto.

A light filter layer 340 may be provided on the color conversion layers 330R and 330G and the transmission layer 330B.

The light filter layer 340 may transmit light of a predetermined wavelength, and may reflect or absorb light other than that of the predetermined wavelength. The light filter layer 340 may include a structure in which layers having a high refractive index and layers having a low refractive index are alternately stacked about 10 to 20 times. That is, the light filter layer 340 may have a structure in which a plurality of layers with different refractive indices are stacked. It may transmit and/or reflect the light of the specific wavelength as described by using reinforcement interference and/or destructive interference between the layer having a high refractive index and the layer having a low refractive index.

The light filter layer 340 may include at least one of $TiO_2$, $SiN_x$, $SiO_y$, TiN, AlN, $Al_2O_3$, $SnO_2$, $WO_3$, and $ZrO_2$, and for example, it may have a structure in which $SiN_x$ and $SiO_y$ are alternately stacked. Regarding the SiNx and SiOy, x and y are factors for determining a chemical composition ratio, and they are controllable according to a processing condition for forming layers.

Although not shown in the present specification, capping layers (not shown) between the light filter layer 340 and the red color conversion layer 330R, between the light filter layer 340 and the green color conversion layer 330G, and between the light filter layer 340 and the transmission layer 330B may further be included, and the capping layers may prevent the semiconductor nanocrystals 331R and 331G included in the red color conversion layer 330R and the green color conversion layer 330G from being damaged and quenched in high-temperature processes after the red color conversion layer 330R, the green color conversion layer 330G, and the transmission layer 330B are formed. The capping layers may be omitted when they are made of the same material as the light filter layer 340.

The color conversion display panel 30 includes semiconductor nanocrystals 331R and 331G with a predetermined content and scatterers 335R and 335G so it may efficiently convert and output the light supplied to the color conversion layers 330R and 330G. Therefore, the amount of light output in a user's direction increases to increase color reproducibility and efficiently use supplied blue light.

Figure 2:
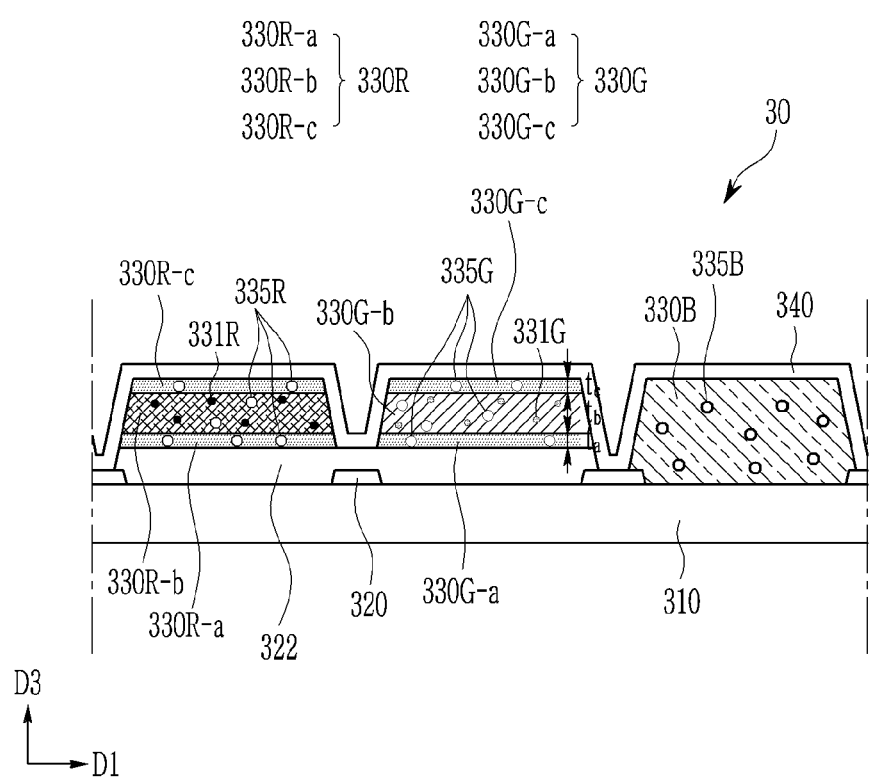
FIG. 2 shows a cross-sectional view of a color conversion display panel according to a modified exemplary embodiment of an exemplary embodiment of FIG. 1.
Figure 3:
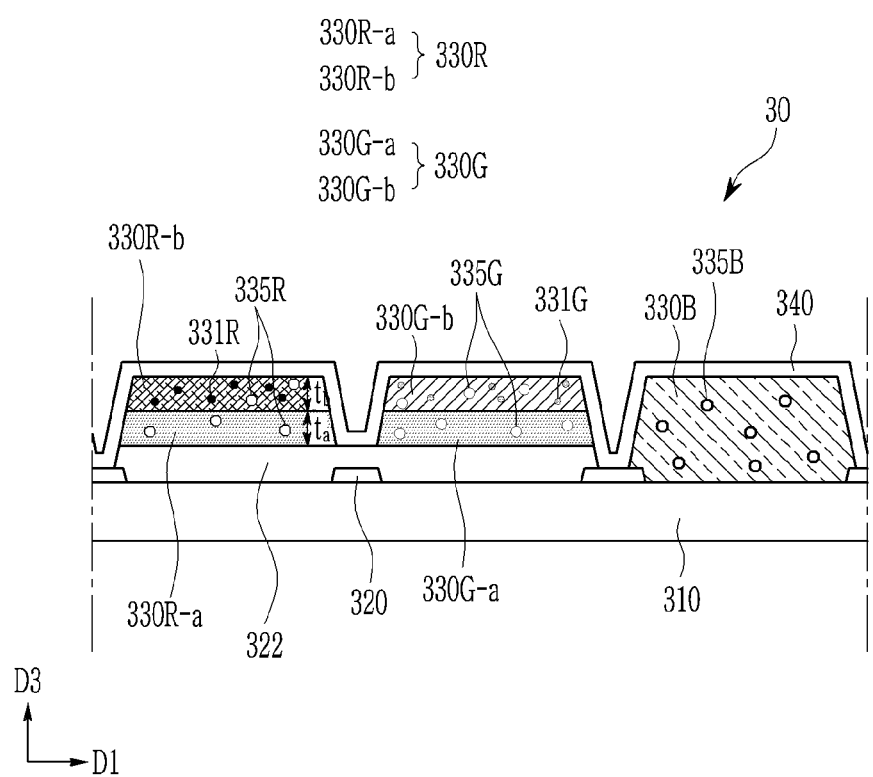
FIG. 3 shows a cross-sectional view of a color conversion display panel according to a modified exemplary embodiment of an exemplary embodiment of FIG. 1.
Figure 4:
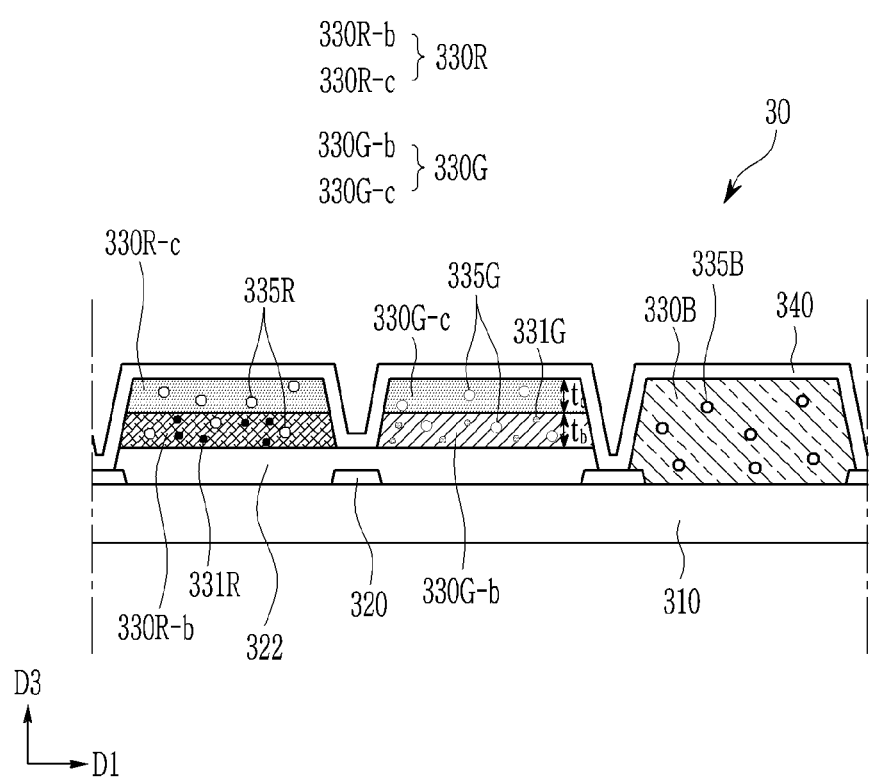
FIG. 4 shows a cross-sectional view of a color conversion display panel according to a modified exemplary embodiment of an exemplary embodiment of FIG. 1.

Various modified exemplary embodiments of the color conversion display panel according to an exemplary embodiment of FIG. 1 will now be described with reference to FIG. 2 to FIG. 4. FIG. 2, FIG. 3, and FIG. 4 respectively show a cross-sectional view of a color conversion display panel according to modified exemplary embodiments of an exemplary embodiment of FIG. 1, and same or similar constituent elements as the above-described constituent elements may not be described.

Referring to FIG. 2, the color conversion display panel 30 may include a light blocking member 320, a blue light cutting filter 322, a plurality of color conversion layers 330R and 330G, a transmission layer 330B, and a light filter layer 340 provided on a substrate 310.

The red color conversion layer 330R may include a first scattering layer 330R-a, a first main color conversion layer 330R-b, and a second scattering layer 330R-c that are sequentially stacked on the substrate 310 in the third direction D3. The first scattering layer 330R-a and the second scattering layer 330R-c may include a scatterer 335R, and they include no additional semiconductor nanocrystal. The first main color conversion layer 330R-b may include a first semiconductor nanocrystal 331R together with the scatterer 335R.

The first main color conversion layer 330R-b for converting incident blue light into red light and outputting resultant light is provided between the first scattering layer 330R-a and the second scattering layer 330R-c. The first scattering layer 330R-a scatters blue light input to the first scattering layer 330R-a so that a greater amount of light may be supplied to the first main color conversion layer 330R-b. The second scattering layer 330R-c may scatter the light converted into a red color and output as red light by the first main color conversion layer 330R-b to improve visibility. Further, the second scattering layer 330R-c may scatter (reflect) the blue light not converted by the first main color conversion layer 330R-b but output as it is in the direction of the first main color conversion layer 330R-b and output to increase light efficiency. In other words, the second scattering layer 330R-c may reflect the blue light from the first main color conversion layer 330R-b back to the first main color conversion layer 330R-b to increase light efficiency.

The content of the scatterer 335R included in the red color conversion layer 330R may be less than about 12 wt % of the entire content of the red color conversion layer 330R. That is, the whole content of the scatterer 335R included in the first scattering layer 330R-a, the second scattering layer 330R-c, and the first main color conversion layer 330R-b may be less than about 12 wt % of the entire content of the red color conversion layer 330R. When the content of the scatterer 335R is greater than about 12 wt % of the entire content, the amount of blue light scattered and output without color conversion may increase. Accordingly, the light conversion efficiency of the first semiconductor nanocrystal 331R reduces so the light outputting efficiency and color reproducibility may reduce.

The content of the first semiconductor nanocrystal 331R included in the first main color conversion layer 330R-b may be greater than about 30 wt % of the entire content of the red color conversion layer 330R, and it may desirably include about 40 to 60 wt % of the content. When the content of the first semiconductor nanocrystal 331R is less than about 40 wt %, the efficiency to convert the supplied blue light into red light may be low. When the content of the first semiconductor nanocrystal 331R is greater than about 60 wt %, an appropriate level of the first semiconductor nanocrystal 331R included in the red color conversion layer 330R becomes excessive so the conversion efficiency may be deteriorated.

In a like manner, the green color conversion layer 330G may include a first scattering layer 330G-a, a second main color conversion layer 330G-b, and a second scattering layer 330G-c. The first scattering layer 330G-a and the second scattering layer 330G-c may include a scatterer 335G and include no additional semiconductor nanocrystal. The second main color conversion layer 330G-b may include the second semiconductor nanocrystal 331G together with the scatterer 335G.

The second main color conversion layer 330G-b for converting incident blue light into green light is provided between the first scattering layer 330G-a and the second scattering layer 330G-c. The first scattering layer 330G-a scatters the light input to the first scattering layer 330G-a so that a greater amount of blue light may be supplied to the second main color conversion layer 330G-b. The second scattering layer 330G-c may scatter the red light that is converted into green light and output by the second main color conversion layer 330G-b to improve visibility. Further, the second scattering layer 330G-c may scatter the blue light that is not converted by the second main color conversion layer 330G-b but that is output as it is in the direction of the second main color conversion layer 330G-b to increase the output light efficiency.

The content of the scatterer 335G included in the green color conversion layer 330G may be less than about 12 wt % of the entire content of the green color conversion layer 330G. That is, the whole content of the scatterer 335G included in the first scattering layer 330G-a, the second scattering layer 330G-c, and the second main color conversion layer 330G-b may be less than about 12 wt % of the entire content of the green color conversion layer 330G. When the content of the scatterer 335G is greater than about 12 wt % of the entire content, the amount of blue light scattered and output without color conversion may increase. Accordingly, the light conversion efficiency of the second semiconductor nanocrystal 331G reduces so the light outputting efficiency and color reproducibility may reduce.

The second semiconductor nanocrystal 331G included in the second main color conversion layer 330G-b may be included at greater than about 30 wt % of the entire content of the green color conversion layer 330G, and it may desirably include about 40 to 60 wt % of the content. When the content of the second semiconductor nanocrystal 331G is less than about 40 wt %, the efficiency to convert the supplied blue light into green light may be low. When the content of the second semiconductor nanocrystal 331G is greater than about 60 wt %, an appropriate level of the second semiconductor nanocrystal 331G included in the green color conversion layer 330G becomes excessive so the conversion efficiency may be deteriorated.

The first scattering layers 330R-a, 330G-a and the second scattering layers 330R-c, 330G-c may respectively have a thickness ta, tc of about 1 to 2 μm. Further, the first main color conversion layer 330R-b and the second main color conversion layer 330G-b may respectively have a thickness tb of about 2 to 4 μm. When formed to be thinner than the above-noted thickness, the contents of the scatterers 335R and 335G and the semiconductor nanocrystals 331R and 331G included in respective layers may be very much less (may not be enough) so it may be difficult to scatter light or convert the same. Also, when the scattering layer is formed to be thicker than 2 μm or the main color conversion layer is formed to be thicker than 4 μm, the light scattering effect may be excellent but the layers including semiconductor nanocrystal are formed to be thinner than the scattering layer, so the light conversion efficiency is deteriorated, and the amount of light converted and output in the user's direction may be reduced.

The description provided with reference to FIG. 1 as well as the above description is applicable to the present exemplary embodiment.

Referring to FIG. 3, the color conversion display panel 30 may include a light blocking member 320, a blue light cutting filter 322, a plurality of color conversion layers 330R and 330G, a transmission layer 330B, and a light filter layer 340 provided on the substrate 310.

The red color conversion layer 330R may include a first scattering layer 330R-a and a first main color conversion layer 330R-b stacked in the third direction D3. The first scattering layer 330R-a may include a scatterer 335R and includes no additional semiconductor nanocrystal. The first main color conversion layer 330R-b may include a first semiconductor nanocrystal 331R together with the scatterer 335R.

The first scattering layer 330R-a scatters the supplied blue light so that a greater amount of light may be supplied to the first main color conversion layer 330R-b. By increasing the amount of the supplied blue light, the amount of light converted into red light by the first main color conversion layer 330R-b and then output may increase.

The scatterer 335R included in the red color conversion layer 330R may be less than about 12 wt % of the entire content of the red color conversion layer 330R. That is, the whole content of the scatterer 335R included in the first scattering layer 330R-a and the first main color conversion layer 330R-b may be less than about 12 wt % of the entire content of the red color conversion layer 330R. When the content of the scatterer 335R is greater than about 12 wt % of the entire content, the amount of blue light scattered and output without color conversion may increase. Accordingly, the light conversion efficiency of the first semiconductor nanocrystal 331R reduces so the light outputting efficiency and color reproducibility may reduce.

The first semiconductor nanocrystal 331R included in the first main color conversion layer 330R-b may be greater than about 30 wt % of the entire content of the red color conversion layer 330R, and it may desirably include about 40 to 60 wt % of the content. When the content of the first semiconductor nanocrystal 331R is less than about 40 wt %, the efficiency to convert the supplied blue light into red light may be low. When the content of the first semiconductor nanocrystal 331R is greater than about 60 wt %, an appropriate level of the first semiconductor nanocrystal 331R included in the red color conversion layer 330R becomes excessive so the conversion efficiency may be deteriorated.

In a like manner, the green color conversion layer 330G may include a second scattering layer 330G-a and a second main color conversion layer 330G-b. The second scattering layer 330G-a may include a scatterer 335G and includes no additional semiconductor nanocrystal. The second main color conversion layer 330G-b may include a second semiconductor nanocrystal 331G together with the scatterer 335G.

The second scattering layer 330G-a included in the green color conversion layer 330G scatters the supplied light so that a greater amount of light may be supplied to the second main color conversion layer 330G-b. The amount of the supplied blue light increases so the amount of light converted into a green color by the second main color conversion layer 330G-b and then output may also increase.

The scatterer 335R included in the green color conversion layer 330G may be less than about 12 wt % of the entire content of the green color conversion layer 330G. That is, the whole content of the scatterer 335R included in the second scattering layer 330G-a and the second main color conversion layer 330G-b may be less than about 12 wt % of the entire content of the green color conversion layer 330G. When the content of the scatterer 335R is greater than about 12 wt % of the entire content, the amount of blue light scattered and output without color conversion may increase. Accordingly, the light conversion efficiency of the second semiconductor nanocrystal 331G reduces so the light outputting efficiency and color reproducibility may reduce.

The second semiconductor nanocrystal 331G included in the second main color conversion layer 330G-b may be included at greater than about 30 wt % of the entire content of the green color conversion layer 330G, and it may be desirably included at the content of about 40 to 60 wt %. When the content of the second semiconductor nanocrystal 331G is less than about 40 wt %, the efficiency to convert the supplied blue light into green light may be low. When the content of the second semiconductor nanocrystal 331G is greater than about 60 wt %, an appropriate level of the second semiconductor nanocrystal 331G included in the green color conversion layer 330G is excessive so the conversion efficiency may be deteriorated.

A ratio of a thickness tb of the first main color conversion layer 330R-b of the red color conversion layer 330R and a thickness ta of the first scattering layer 330R-a is equal to or greater than about 1:2 and equal to or less than about 2:1, and it may exemplarily be about 1:1. In a like manner, a ratio of a thickness tb of the second main color conversion layer 330G-b and a thickness ta of the second scattering layer 330G-a is equal to or greater than about 1:2 and equal to or less than about 2:1, and it may exemplarily be about 1:1. In a range that satisfies the ratio, the first scattering layer 330R-a, the first main color conversion layer 330R-b, the second scattering layer 330G-a, and the second main color conversion layer 330G-b may respectively have a thickness of about 2 to 4 μm. When the respective layers are formed to be thinner than the above-noted thickness or they are formed to be less than the above-noted ratio, the contents of the scatterer and the semiconductor nanocrystal included in the layers are very much less, so the efficiency to scatter the light or convert it may be very small. Further, when the layers are formed to be thicker than the thickness or they are formed to be greater than the above-noted ratio, the light scattering effect may be excellent, but the layer including the semiconductor nanocrystal is thinner than the scattering layer, so the light conversion efficiency may be deteriorated and the amount of light converted and output in the user's direction may reduce.

The content described with reference to FIG. 1 as well as the above-provided description is applicable to the present exemplary embodiment.

Referring to FIG. 4, the color conversion display panel 30 may include a light blocking member 320, a blue light cutting filter 322, a plurality of color conversion layers 330R and 330G, a transmission layer 330B, and a light filter layer 340 provided on a substrate 310.

The red color conversion layer 330R may include a first main color conversion layer 330R-b and a first scattering layer 330R-c. The first scattering layer 330R-c may include a scatterer 335R and includes no additional semiconductor nanocrystal. The first main color conversion layer 330R-b may include a first semiconductor nanocrystal 331R together with the scatterer 335R.

The first scattering layer 330R-c may scatter the light converted into red light and output by the first main color conversion layer 330R-b to improve visibility. Further, the first scattering layer 330R-c may scatter the blue light not converted by the first main color conversion layer 330R-b but output as it is in the direction of the first main color conversion layer 330R-b and output it to increase the amount of blue light provided to the first semiconductor nanocrystal 331R.

The content of the scatterer 335R included in the red color conversion layer 330R may be less than about 12 wt % of the entire content of the red color conversion layer 330R. That is, the whole content of the scatterer 335R included in the first scattering layer 330R-c and the first main color conversion layer 330R-b may be less than about 12 wt % of the entire content of the red color conversion layer 330R. When the content of the scatterer 335R is greater than about 12 wt % of the entire content, the amount of incident light that is scattered and output without conversion may increase. Accordingly, the light conversion efficiency of the first semiconductor nanocrystal 331R reduces so the light outputting efficiency and color reproducibility may reduce.

In a like manner, the green color conversion layer 330G may include a second main color conversion layer 330G-b and a second scattering layer 330G-c. The second scattering layer 330G-c may include a scatterer 335G and includes no additional semiconductor nanocrystal. The second main color conversion layer 330G-b may include a second semiconductor nanocrystal 331G together with the scatterer 335G.

The second scattering layer 330G-c may scatter the light that is converted into green light and output by the second main color conversion layer 330G-b to improve visibility. Further, the second scattering layer 330G-c may scatter the blue light that is not converted by the second main color conversion layer 330G-b but that is output as it is in the direction of the second main color conversion layer 330G-b to increase the output light efficiency.

The content of the scatterer 335G included in the green color conversion layer 330G may be less than about 12 wt % of the entire content of the green color conversion layer 330G. That is, the whole content of the scatterer 335G included in the second scattering layer 330G-c and the second main color conversion layer 330G-b may be less than about 12 wt % of the entire content of the green color conversion layer 330G. When the content of the scatterer 335G is greater than about 12 wt % of the entire content, the amount of light scattered and output without color conversion may increase. Accordingly, the light conversion efficiency of the second semiconductor nanocrystal 331G reduces so the light outputting efficiency and color reproducibility may reduce.

The ratio of the thickness tb of the first main color conversion layer 330R-b and the thickness tc of the first scattering layer 330R-c is equal to or greater than about 1:2 and equal to or less than about 2:1, and it may exemplarily be about 1:1. In a like manner, the ratio of the thickness tb of the second main color conversion layer 330G-b and the thickness tc of the second scattering layer 330G-c is equal to or greater than about 1:2 and equal to or less than about 2:1, and it may exemplarily be about 1:1. In a range that satisfies the ratio, the first main color conversion layer 330R-b, the first scattering layer 330R-c, the second main color conversion layer 330G-b, and the second scattering layer 330G-c may respectively have a thickness of about 2 to 4 µm. When the respective layers are formed to be thinner than the above-noted thickness or they are formed to be less than the above-noted ratio, the content of the scatterer and the semiconductor nanocrystal included in the layers are very much less, so the efficiency to scatter the light or convert it may be very small. Further, when the layers are formed to be thicker than the thickness or they are formed to be greater than the above-noted ratio, the light scattering effect may be excellent, but the layer including the semiconductor nanocrystal is thinner than the scattering layer, so the light conversion efficiency may be deteriorated and the amount of light converted and output in the user's direction may reduce.

The content described with reference to FIG. 1 as well as the above-provided description is applicable to the present exemplary embodiment.

Figure 5:
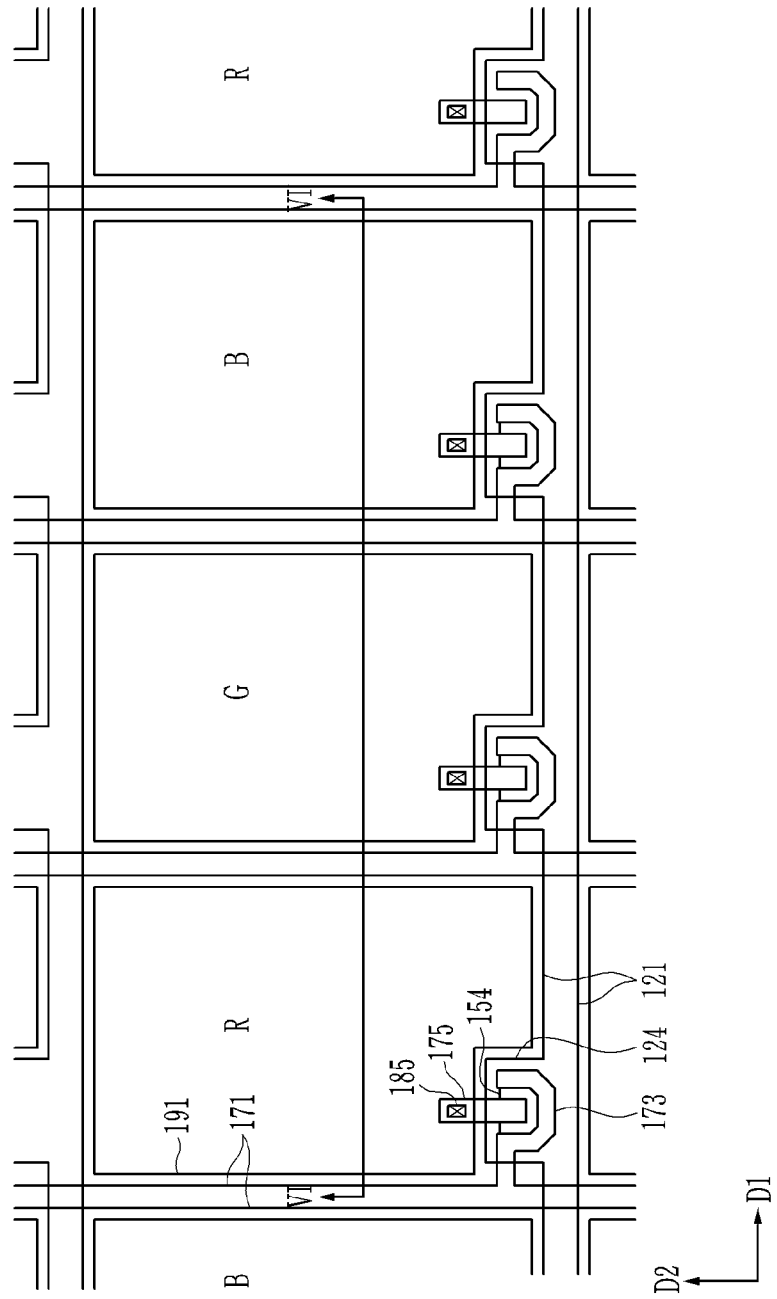
FIG. 5 shows a top plan view of a display device including a plurality of pixels according to an exemplary embodiment.
Figure 6:
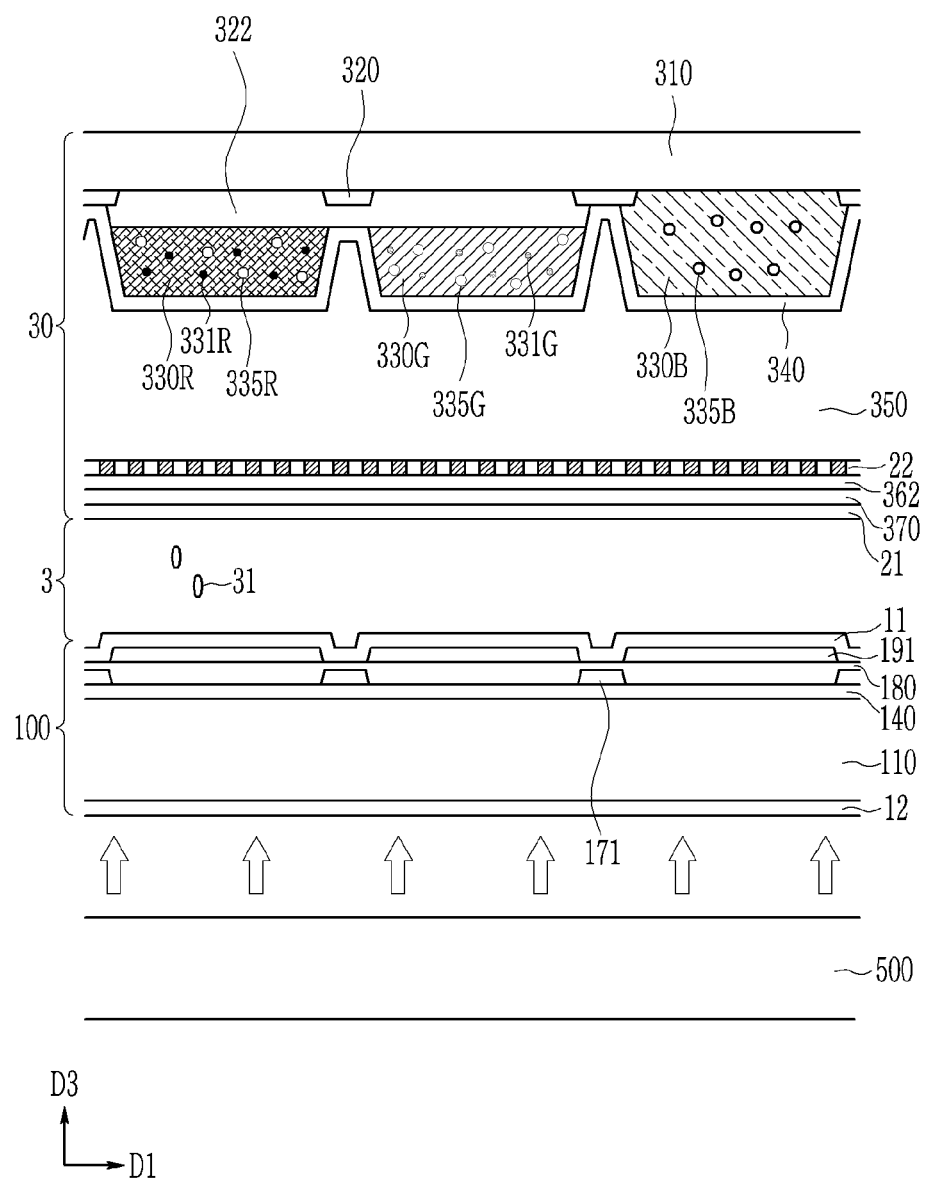
FIG. 6 shows a cross-sectional view with respect to a line VI-VI of FIG. 5.

A display device according to an exemplary embodiment will now be described with reference to FIG. 5 and FIG. 6. FIG. 5 shows a top plan view of a plurality of pixels according to an exemplary embodiment, and FIG. 6 shows a cross-sectional view with respect to a line VI-VI of FIG. 5. Same or similar constituent elements as those of the above-described color conversion display panel may not be described.

Referring to FIG. 5 and FIG. 6, the display device includes a light unit 500, a thin film transistor array panel 100, a color conversion display panel 30 separated from the thin film transistor array panel 100 and facing the same, and a liquid crystal layer 3 provided between the thin film transistor array panel 100 and the color conversion display panel 30.

The light unit 500 may include a light source provided on a rear side of the thin film transistor array panel 100 and generating light, and a light guide (not shown) for receiving the light and guiding the received light toward the thin film transistor array panel 100 and the color conversion display panel 30.

The light unit 500 may include any kinds of light sources for emitting blue light, and it may exemplarily include a light emitting diode (LED). The light source may be an edge type by which the light source is disposed on at least one side of a light guide (not shown), or a bottom type by which the light source is provided at a bottom of a light guide (not shown), but the light source is not limited thereto. The above-described light unit 500 including a blue light source may be modified into a light unit 500 including a white light source or an ultraviolet ray light source, and the modified one may be used. For ease of description, a display device using a light unit 500 including a blue light source will be used hereinafter.

The thin film transistor array panel 100 includes a first polarization layer 12 provided between a first substrate 110 and the light unit 500. The first polarization layer 12 polarizes light input by the light unit 500.

The first polarization layer 12 may be at least one of a deposition-type polarization layer, a coating-type polarization layer, and a wire grid polarizer. The first polarization layer 12 may be formed on one side of the first substrate 110 according to various forms such as a film type, a deposition type, or a printing type.

A plurality of pixels are disposed as a matrix on the first substrate 110.

The thin film transistor array panel 100 may include a gate line 121 extending in the first direction D1 between the first substrate 110 and the liquid crystal layer 3 and including a gate electrode 124, a gate insulating layer 140 provided between the gate line 121 and the liquid crystal layer 3, a semiconductor layer 154 provided between the gate insulating layer 140 and the liquid crystal layer 3, a data line 171 provided between the semiconductor layer 154 and the liquid crystal layer 3 and extending in the second direction D2, a source electrode 173 connected to the data line 171, a drain electrode 175 separated from the source electrode 173, and a passivation layer 180 provided between the data line 171 and the liquid crystal layer 3.

The semiconductor layer 154 forms a channel layer at a portion not covered by the source electrode 173 and the drain electrode 175, and the gate electrode 124, the semiconductor layer 154, the source electrode 173, and the drain electrode 175 form a thin film transistor.

A pixel electrode 191 is provided on the passivation layer 180. The pixel electrode 191 may be physically and electrically connected to the drain electrode 175 through a contact hole 185 of the passivation layer 180.

A first alignment layer 11 may be provided between the pixel electrode 191 and the liquid crystal layer 3.

The color conversion display panel 30 includes a second substrate 310 overlapping the thin film transistor array panel 100, and a light blocking member 320 provided between the second substrate 310 and the liquid crystal layer 3. In addition, a blue light cutting filter 322 is provided between the second substrate 310 and the color conversion layers 330R and 330G.

The blue light cutting filter 322 may block or absorb the blue light supplied by the light unit 500. The blue light input to the red color conversion layer 330R and the green color conversion layer 330G from the light unit 500 is converted into the red or green light by the semiconductor nanocrystals 331R and 331G, and in this instance, part of the blue light may not be converted and may then be output, and such blue light and red light or green light may be mixed together to deteriorate color reproducibility.

The red color conversion layer 330R and the green color conversion layer 330G may be provided between the blue light cutting filter 322 and the liquid crystal layer 3, and the transmission layer 330B may be provided between the second substrate 310 and the liquid crystal layer 3. The transmission layer 330B may output incident light without color conversion, and for example, it may receive blue light and may output blue light.

The first semiconductor nanocrystal 331R may be included at greater than about 30 wt % of the entire content of the red color conversion layer 330R, and it may desirably be included at the content of about 40 to 60 wt %. The second semiconductor nanocrystal 331G may be included at greater than about 30 wt % of the entire content of the green color conversion layer 330G, and it may be included at the content of about 40 to 60 wt %. When the content of the first and second semiconductor nanocrystals 331R and 331G is equal to or less than about 40 wt %, the efficiency to convert supplied blue light into red light or green light may be low. When the content of the first and second semiconductor nanocrystals 331R and 331G is greater than about 60 wt %, appropriate levels of the first and second semiconductor nanocrystals 331R and 331G included in the red and green color conversion layers 330R and 330G become excessive so the conversion efficiency may be deteriorated.

At least one of the red color conversion layer 330R, the green color conversion layer 330G, and the transmission layer 330B may further include scatterers 335R, 335G, and 335B. The contents of the respective scatterers included in the red color conversion layer 330R, the green color conversion layer 330G, and the transmission layer 330B may be different.

According to an exemplary embodiment, the content of the scatterers 335R and 335G included in the red color conversion layer 330R and the green color conversion layer 330G may be equal to or less than about 12 wt % of the entire content of the red color conversion layer 330R and the green color conversion layer 330G. When the content of the scatterers 335R and 335G is greater than about 12 wt %, the amount of light converted by the semiconductor nanocrystals 331R and 331G may reduce, and the amount of light scattered and output without conversion may increase.

The light filter layer 340 may be provided between a plurality of color conversion layers 330R and 330G and the liquid crystal layer 3 and between the transmission layer 330B and the liquid crystal layer 3. The light filter layer 340 may overlap the front side of the second substrate 310, and the light filter layer 340 may be omitted according to an exemplary embodiment.

An overcoating layer 350 is provided between the light filter layer 340 and the liquid crystal layer 3. The overcoating layer 350 may overlap the front side of the second substrate 310.

The overcoating layer 350 may smooth one side of the red color conversion layer 330R, the green color conversion layer 330G, and the transmission layer 330B. The overcoating layer 350 may include an organic material, and without being limited to this, any kinds of materials for performing a smoothing function are usable.

A second polarization layer 22 may be provided between the overcoating layer 350 and the liquid crystal layer 3. The second polarization layer 22 may use at least one of a deposition-type polarization layer, a coating-type polarization layer, and a wire grid polarizer, and for example, the second polarization layer 22 may be a wire grid polarizer including a metal pattern. The second polarization layer 22 may be provided between the overcoating layer 350 and the liquid crystal layer 3 according to various forms such as a film type, a deposition type, an attaching type, or a printing type. When the second polarization layer 22 is a wire grid polarizer, the second polarization layer 22 may include a plurality of bars with a width of several nanometers.

An insulating layer 362, a common electrode 370, and a second alignment layer 21 are sequentially provided between the second polarization layer 22 and the liquid crystal layer 3.

The insulating layer 362 insulates the metallic second polarization layer 22 and the common electrode 370, and it may be omitted when the second polarization layer 22 is not made of a metal material. The common electrode 370 for receiving a common voltage may form an electric field with the pixel electrode 191.

The liquid crystal layer 3 is provided between the thin film transistor array panel 100 and the color conversion display panel 30 and includes a plurality of liquid crystal molecules 31. Transmittance of the light received from the light unit 500 may be controlled depending on a movement degree of the liquid crystal molecules 31.

Figure 7:
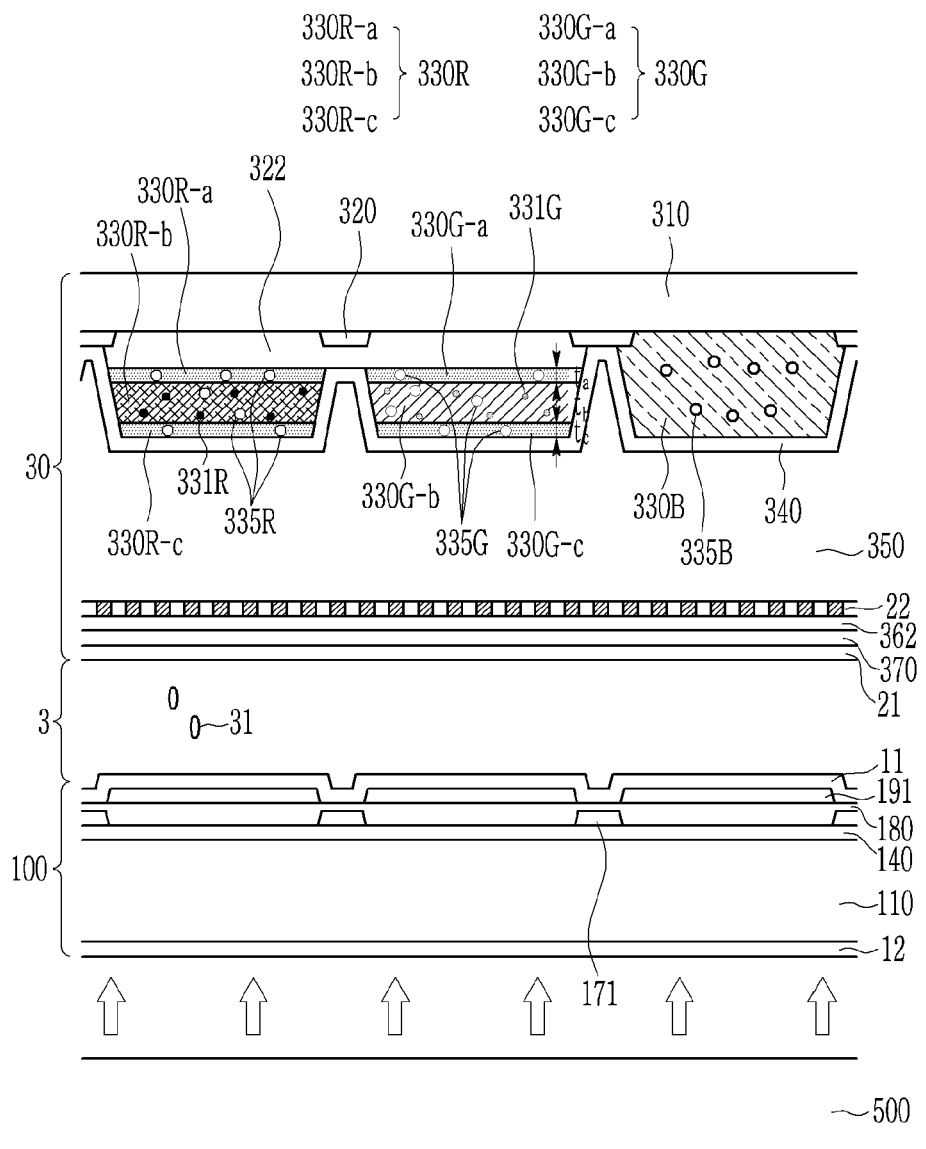
FIG. 7 shows a cross-sectional view of a display device according to a modified exemplary embodiment of an exemplary embodiment of FIG. 6.
Figure 8:
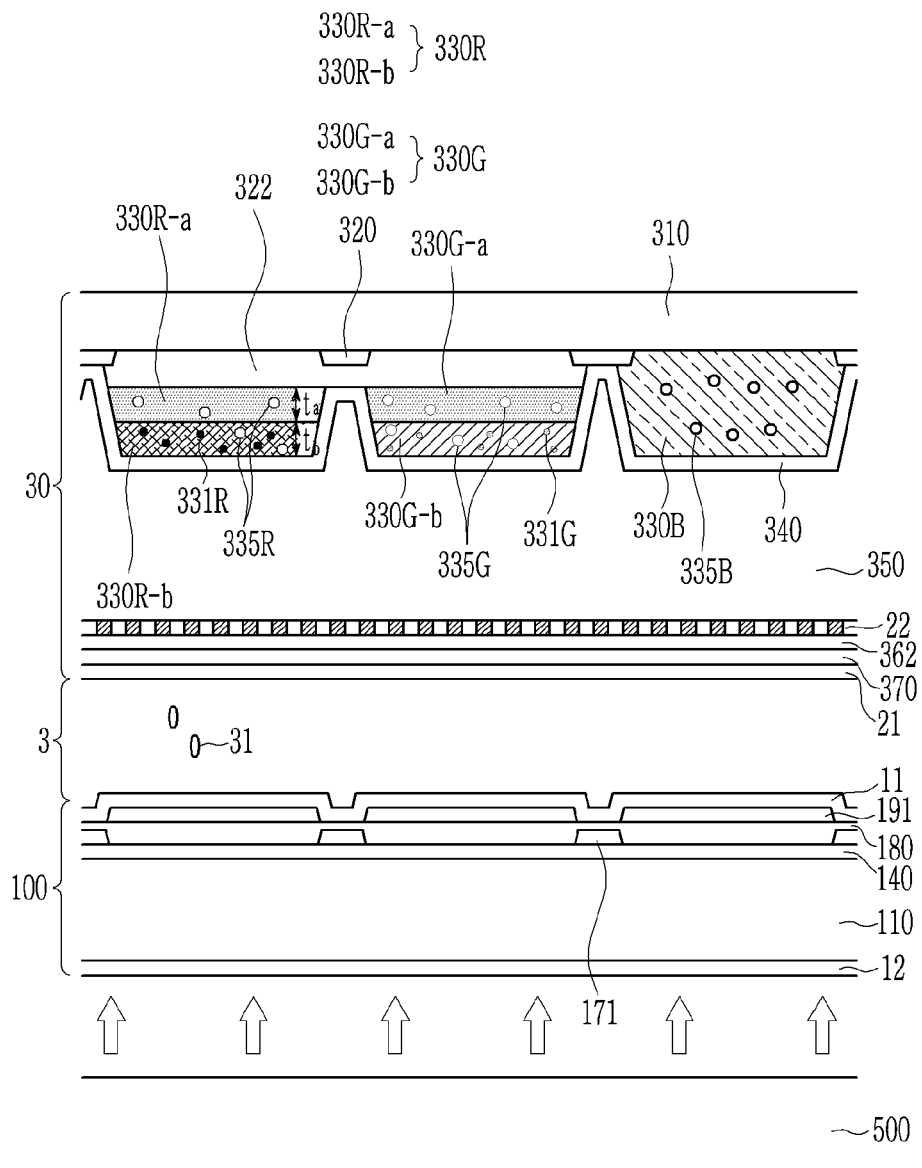
FIG. 8 shows a cross-sectional view of a display device according to a modified exemplary embodiment of an exemplary embodiment of FIG. 6.
Figure 9:
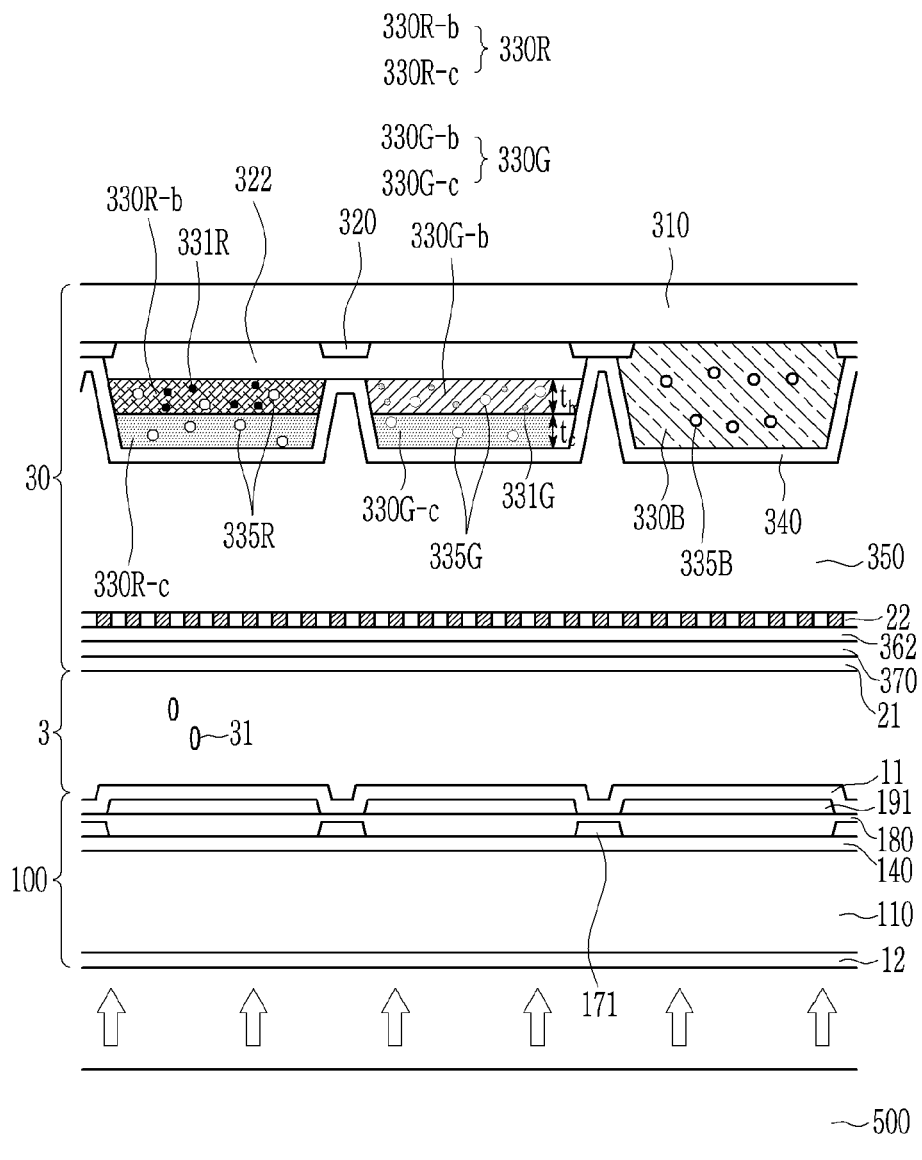
FIG. 9 shows a cross-sectional view of a display device according to a modified exemplary embodiment of an exemplary embodiment of FIG. 6.

A display device according to another exemplary embodiment will now be described with reference to FIG. 7 to FIG. 9. FIG. 7, 8, and FIG. 9 show cross-sectional views with respect to a line VI-VI of FIG. 5 according to another exemplary embodiment. Same constituent elements as those of the above-described constituent elements may not be described.

Referring to FIG. 5 and FIG. 7, the display device includes a light unit 500, a thin film transistor array panel 100, a color conversion display panel 30 separated from the thin film transistor array panel 100 and facing the same, and a liquid crystal layer 3 provided between the thin film transistor array panel 100 and the color conversion display panel 30. The thin film transistor array panel 100 and the liquid crystal layer 3 correspond to the previous description, so no detailed description thereof will be provided.

The color conversion display panel 30 includes a second substrate 310 overlapping the thin film transistor array panel 100, and a light blocking member 320 provided between the second substrate 310 and the liquid crystal layer 3. A blue light cutting filter 322 is provided between the second substrate 310 and the color conversion layers 330R and 330G. The blue light cutting filter 322 is provided to overlap the region emitting red and green colors, and it is not provided in the region emitting the blue color.

The red color conversion layer 330R may include a first scattering layer 330R-a, a first main color conversion layer 330R-b, and a second scattering layer 330R-c. The first scattering layer 330R-a and the second scattering layer 330R-c may include a scatterer 335R and include no additional semiconductor nanocrystal. The first main color conversion layer 330R-b may include a first semiconductor nanocrystal 331R together with the scatterer 335R.

The first main color conversion layer 330R-b for converting incident blue light into red light and outputting the red light is provided between the first scattering layer 330R-a and the second scattering layer 330R-c. The second scattering layer 330R-c scatters blue light that is input to the second scattering layer 330R-c so that a greater amount of light may be supplied to the first main color conversion layer 330R-b. The first scattering layer 330R-a may improve visibility by scattering the light converted into red light and output by the first main color conversion layer 330R-b. Further, the first scattering layer 330R-a may increase the outputting light efficiency by scattering the blue light not converted by the first main color conversion layer 330R-b but output as it is in the direction of the first main color conversion layer 330R-b.

In a like manner, the green color conversion layer 330G may include a first scattering layer 330G-a, a second main color conversion layer 330G-b, and a second scattering layer 330G-c. The first scattering layer 330G-a and the second scattering layer 330G-c may include the scatterer 335G and include no additional semiconductor nanocrystal. The second main color conversion layer 330G-b may include the second semiconductor nanocrystal 331G together with the scatterer 335G.

The second main color conversion layer 330G-b for converting incident blue light into green light and outputting the same is provided between the first scattering layer 330G-a and the second scattering layer 330G-c. The second scattering layer 330G-c scatters the light input to the second scattering layer 330G-c so that a greater amount of blue light may be supplied to the second main color conversion layer 330G-b. The first scattering layer 330G-a may improve visibility by scattering the red light converted into the green color by the second main color conversion layer 330G-b and output. Further, the first scattering layer 330G-a may increase the outputting light efficiency by scattering the blue light not converted by the second main color conversion layer 330G-b but output as it is in the direction of the second main color conversion layer 330G-b.

Respective thicknesses ta, tc of the first scattering layer 330R-a, 330G-a and the second scattering layer 330R-c, 330G-c may be about 1 to 2 μm. Further, the thickness tb of the first main color conversion layer 330R-b and the second main color conversion layer 330G-b may be about 2 to 4 μm. When the respective layers are formed to be thinner than the above-noted thickness, the contents of the scatterers 335R and 335G and the semiconductor nanocrystals 331R and 331G included in the respective layers are very much less, so it may be difficult to scatter light or convert it. Further, when the layers are formed to be thicker than the thickness, the light scattering effect may be excellent, but the layer including the semiconductor nanocrystal is thinner than the scattering layer, so the light conversion efficiency may be deteriorated and the amount of light converted and output in the user's direction may reduce.

The light filter layer 340 may be provided between the plurality of color conversion layers 330R and 330G and the liquid crystal layer 3 and between the transmission layer 330B and the liquid crystal layer 3, and an overcoating layer 350 is provided between the light filter layer 340 and the liquid crystal layer 3. A second polarization layer 22, an insulating layer 362, a common electrode 370, and a second alignment layer 21 may be sequentially provided between the overcoating layer 350 and the liquid crystal layer 3.

A display device according to another exemplary embodiment will now be described with reference to FIG. 5 and FIG. 8.

The display device includes a light unit 500, a thin film transistor array panel 100, a color conversion display panel 30 separated from the thin film transistor array panel 100 and facing the same, and a liquid crystal layer 3 provided between the thin film transistor array panel 100 and the color conversion display panel 30. The thin film transistor array panel 100 and the liquid crystal layer 3 correspond to the previous description, so no detailed description thereof will be provided.

The color conversion display panel 30 includes a second substrate 310 overlapping the thin film transistor array panel 100, and a light blocking member 320 provided between the second substrate 310 and the liquid crystal layer 3. A blue light cutting filter 322 is provided between the second substrate 310 and the color conversion layers 330R and 330G. The red color conversion layer 330R and the green color conversion layer 330G may be provided between the blue light cutting filter 322 and the liquid crystal layer 3, and the transmission layer 330B may be provided between the second substrate 310 and the liquid crystal layer 3.

The red color conversion layer 330R may include a first scattering layer 330R-a and a first main color conversion layer 330R-b. The first scattering layer 330R-a may include a scatterer 335R and includes no additional semiconductor nanocrystal. The first main color conversion layer 330R-b may include the first semiconductor nanocrystal 331R together with the scatterer 335R.

In a like manner, the green color conversion layer 330G may include a second scattering layer 330G-a and a second main color conversion layer 330G-b. The second scattering layer 330G-a may include a scatterer 335G and includes no additional semiconductor nanocrystal. The second main color conversion layer 330G-b may include a second semiconductor nanocrystal 331G together with the scatterer 335G.

The ratio of the thickness tb of the first main color conversion layer 330R-b and the thickness ta of the first scattering layer 330R-a may be equal to or greater than about 1:2 and equal to or less than about 2:1, and it may exemplarily be about 1:1. In a like manner, the ratio of the thickness tb of the second main color conversion layer 330G-b and the thickness ta of the second scattering layer 330G-a may be equal to or greater than about 1:2 and equal to or less than about 2:1, and it may exemplarily be about 1:1. In a range that satisfies the ratio, the first scattering layer 330R-a, the first main color conversion layer 330R-b, the second scattering layer 330G-a, and the second main color conversion layer 330G-b may respectively have a thickness of about 2 to 4 μm. When the respective layers are formed to be thinner than the above-noted thickness or they are formed to be less than the above-noted ratio, the contents of the scatterer and the semiconductor nanocrystal included in the layers are very much less, so the efficiency to scatter the light or convert it may be very small. Further, when the layers are formed to be thicker than the thickness or they are formed to be greater than the above-noted ratio, the light scattering effect may be excellent, but the layer including the semiconductor nanocrystal is thinner than the scattering layer, so the light conversion efficiency may be deteriorated and the amount of light converted and output in the user's direction may reduce.

The light filter layer 340 may be provided between the plurality of color conversion layers 330R and 330G and the liquid crystal layer 3 and between the transmission layer 330B and the liquid crystal layer 3, and an overcoating layer 350 may be provided between the light filter layer 340 and the liquid crystal layer 3. A second polarization layer 22, an insulating layer 362, a common electrode 370, and a second alignment layer 21 may be sequentially provided between the overcoating layer 350 and the liquid crystal layer 3.

A display device according to another exemplary embodiment will now be described with reference to FIG. 5 and FIG. 9.

Referring to FIG. 5 and FIG. 9, the display device includes a light unit 500, a thin film transistor array panel 100, a color conversion display panel 30 separated from the thin film transistor array panel 100 and facing the same, and a liquid crystal layer 3 provided between the thin film transistor array panel 100 and the color conversion display panel 30. The thin film transistor array panel 100 and the liquid crystal layer 3 correspond to the previous description, so no detailed description thereof will be provided.

The color conversion display panel 30 includes a second substrate 310 overlapping the thin film transistor array panel 100, and a light blocking member 320 provided between the second substrate 310 and the liquid crystal layer 3. A blue light cutting filter 322 is provided between the second substrate 310 and the color conversion layers 330R and 330G. The blue light cutting filter 322 is provided to overlap the region emitting red and green light and is not provided in the region emitting blue light.

The red color conversion layer 330R and the green color conversion layer 330G may be provided between the blue light cutting filter 322 and the liquid crystal layer 3, and the transmission layer 330B may be provided between the second substrate 310 and the liquid crystal layer 3.

The red color conversion layer 330R may include a first main color conversion layer 330R-b and a first scattering layer 330R-c. The first scattering layer 330R-c may include a scatterer 335R and includes no additional semiconductor nanocrystal. The first main color conversion layer 330R-b may include a first semiconductor nanocrystal 331R together with the scatterer 335R.

The first scattering layer 330R-c may improve visibility by scattering the light converted into red light and output by the first main color conversion layer 330R-b.

In a like manner, the green color conversion layer 330G may include a second main color conversion layer 330G-b and a second scattering layer 330G-c. The second scattering layer 330G-c may include a scatterer 335G and includes no additional semiconductor nanocrystal. The second main color conversion layer 330G-b may include a second semiconductor nanocrystal 331G together with the scatterer 335G.

The second scattering layer 330G-c may improve visibility by scattering the light converted into green light and output by the second main color conversion layer 330G-b.

The content of the scatterer 335G included in the green color conversion layer 330G may be equal to or less than about 12 wt % of the entire content of the green color conversion layer 330G. That is, the whole content of the scatterer 335G included in the second scattering layer 330G-c and the second main color conversion layer 330G-b may be equal to or less than about 12 wt % of the entire content of the green color conversion layer 330G. When the content of the scatterer 335G is greater than about 12 wt % of the entire content, the amount of light that is scattered and output without conversion may increase. Accordingly, the light conversion efficiency of the second semiconductor nanocrystal 331G reduces so the light outputting efficiency and color reproducibility may reduce.

The ratio of the thickness tb of the first main color conversion layer 330R-b and the thickness tc of the first scattering layer 330R-c is equal to or greater than about 1:2 and equal to or less than about 2:1, and it may exemplarily be about 1:1. In a like manner, the ratio of the thickness tb of the second main color conversion layer 330G-b and the thickness tc of the second scattering layer 330G-c is equal to or greater than about 1:2 and equal to or less than about 2:1, and it may exemplarily be about 1:1. In a range that satisfies the ratio, the first main color conversion layer 330R-b, the second scattering layer 330R-c, the second main color conversion layer 330G-b, and the fourth scattering layer 330G-c may respectively have a thickness of about 2 to 4 μm. When the respective layers are formed to be thinner than the above-noted thickness or they are formed to be less than the above-noted ratio, the content of the scatterer and the semiconductor nanocrystal included in the layers are very much less, so the efficiency to scatter the light or convert it may be very small. Further, when the layers are formed to be thicker than the thickness or they are formed to be greater than the above-noted ratio, the light scattering effect may be excellent, but the layer including the semiconductor nanocrystal is thinner than the scattering layer, so the light conversion efficiency may be deteriorated and the amount of light converted and output in the user's direction may reduce.

Figure 10:
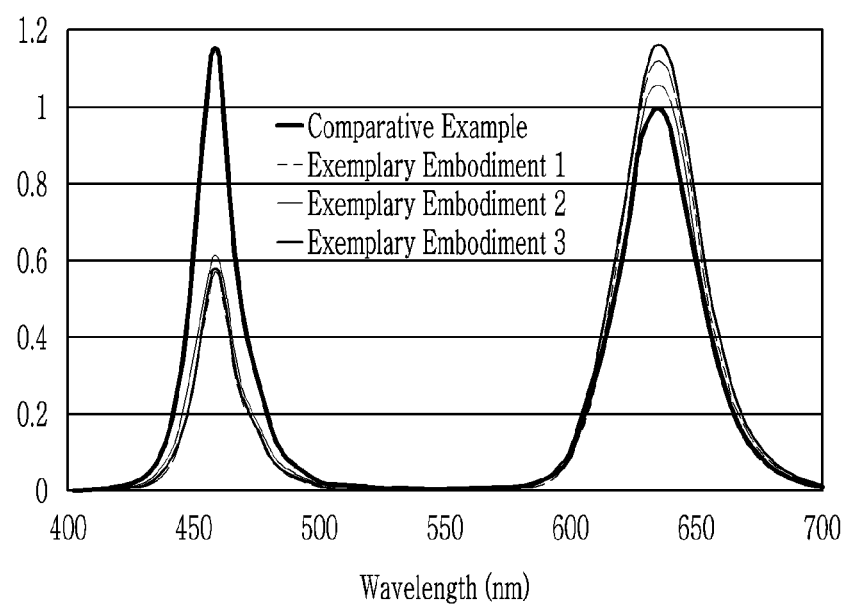
FIG. 10 shows a graph of light outputting efficiency at a pixel emitting red light according to an exemplary embodiment and a comparative example.
Figure 11:
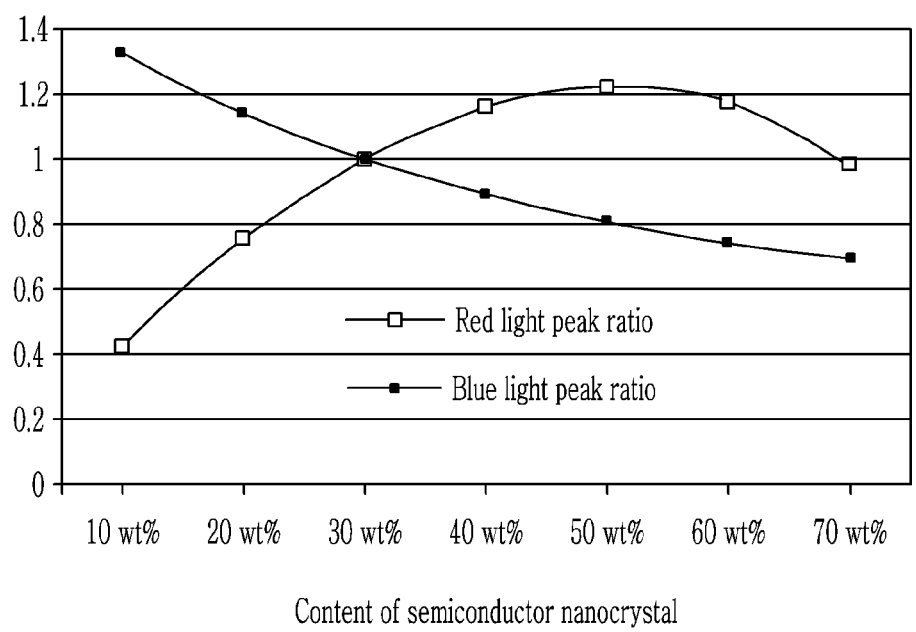
FIG. 11 shows a graph of light outputting efficiency at a pixel emitting red light according to a content of a semiconductor nanocrystal.
Figure 12:
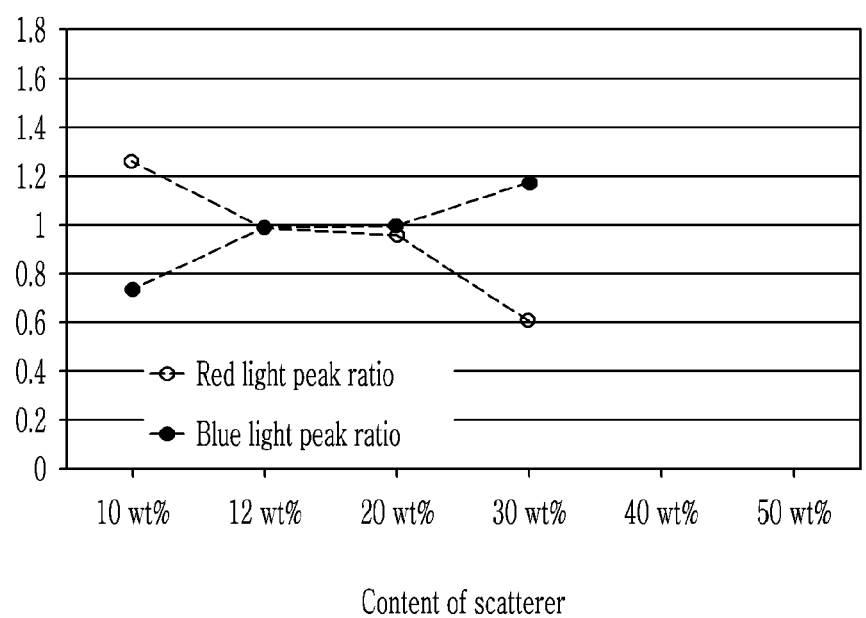
FIG. 12 shows a graph of light outputting efficiency at a pixel emitting red light according to a content of a scatterer.
Figure 13:
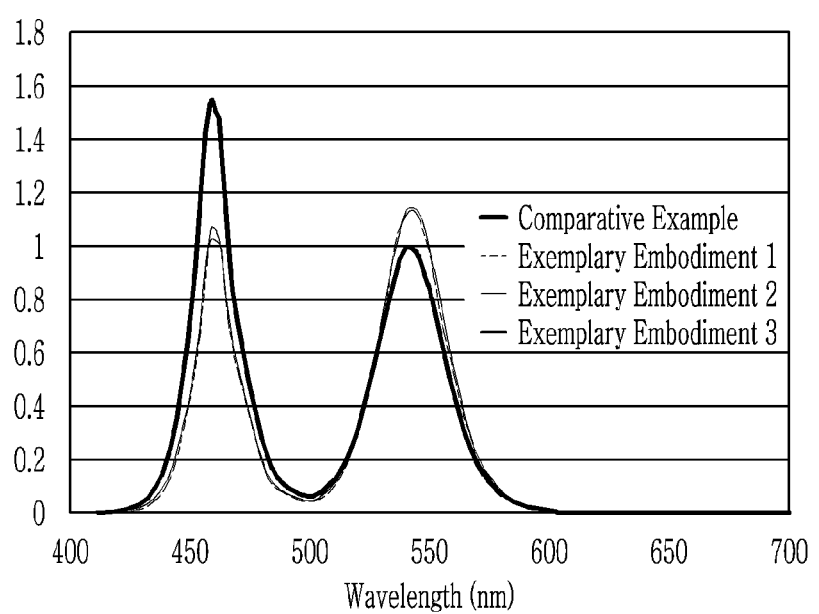
FIG. 13 shows a graph of light outputting efficiency at a pixel emitting green light according to an exemplary embodiment and a comparative example.
Figure 14:
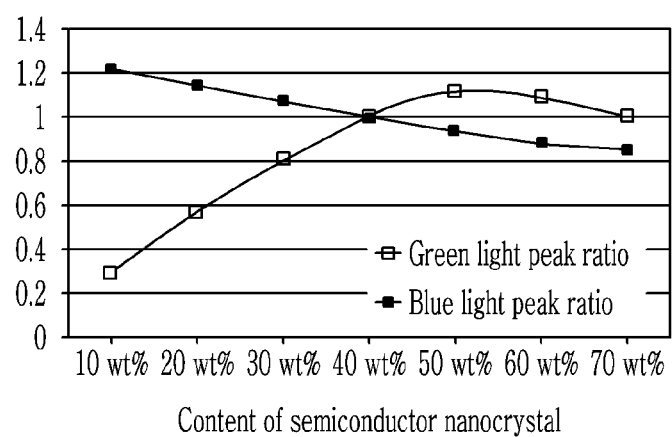
FIG. 14 shows a graph of light outputting efficiency at a pixel emitting green light according to a content of a semiconductor nanocrystal.
Figure 15:
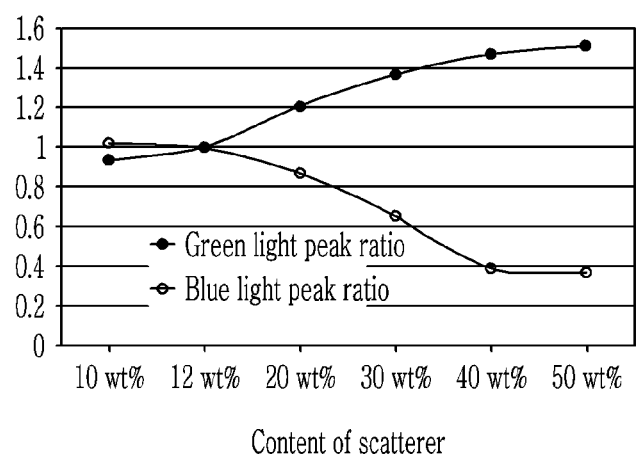
FIG. 15 shows a graph of light outputting efficiency at a pixel emitting green light according to a content of a scatterer.

An exemplary embodiment and a comparative example according to the inventive concept will now be described with reference to FIG. 10 to FIG. 15. FIG. 10 shows a graph of light outputting efficiency at a pixel emitting red light according to an exemplary embodiment and a comparative example, FIG. 11 shows a graph of light outputting efficiency at a pixel emitting red light according to a content of the semiconductor nanocrystal, and FIG. 12 shows a graph of light outputting efficiency at a pixel emitting red light according to a content of a scatterer. Further, FIG. 13 shows a graph of light outputting efficiency at a pixel emitting green light according to an exemplary embodiment and a comparative example, FIG. 14 shows a graph of light outputting efficiency at a pixel emitting green light according to a content of the semiconductor nanocrystal, and FIG. 15 shows a graph of light outputting efficiency at a pixel emitting green light according to a content of a scatterer.

Referring to FIG. 10, Exemplary Embodiment 1 is a color conversion display panel of FIG. 2, Exemplary Embodiment 2 is a color conversion display panel of FIG. 3, Exemplary Embodiment 3 is a color conversion display panel of FIG. 4, and Comparative Example is a color conversion display panel with a single color conversion layer including the semiconductor nanocrystal and a scatterer.

Regarding FIG. 10, the amount of blue light when the blue light input to the color conversion display panel returns by a scatterer is measured, and the amount of red light when the blue light input to the color conversion display panel is converted by the semiconductor nanocrystal and is output in the user's direction (outside of the substrate) is measured.

In the graph of FIG. 10, an x axis is a wavelength band of output light, and a y axis represents a ratio of the amount of output light according to an exemplary embodiment vs. Comparative Example.

As shown in FIG. 10, it is found that the wavelength band of red light (600 nm to 700 nm) according to Exemplary Embodiments 1 to 3 has output of a greater amount of red light than that of Comparative Example, and it is found that a very much lesser amount of blue light is detected in the wavelength band of blue light (400 to 500 nm) according to Exemplary Embodiments 1 to 3 compared to Comparative Example.

That is, it is found that much more red light is output in the incident direction to the user in Exemplary Embodiments compared to Comparative Example. Further, it is found that the amount of light that is not converted into red light but returns in the direction of the light unit by the scatterer reduces, which means that a greater amount of light is converted into red light from blue light and the red light is then output, compared to Comparative Example.

Light outputting efficiency of a color conversion display panel according to an exemplary embodiment will now be described with reference to Table 1 to Table 3.

Exemplary Embodiment 1 shows a red pixel in which the thickness of the first scattering layer and the second scattering layer is 1.5 μm and the thickness of the first main color conversion layer is 3 μm in the color conversion display panel according to an exemplary embodiment of FIG. 2. Comparative Example 1 shows a red pixel in which the thickness of the first scattering layer and the second scattering layer is 3 μm and the thickness of the first main color conversion layer is 6 μm according to an exemplary embodiment of FIG. 2.

Regarding Exemplary Embodiment 1 and Comparative Example 1, the measured amounts of red light and blue light are expressed in Table 1 with reference to the amounts of the red light output in the user's direction and the blue light returning in the direction of the light unit on the color conversion layer with a single-layered structure including a semiconductor nanocrystal and a scatterer.

Referring to Table 1, it is found that, when a predetermined thickness is satisfied according to Exemplary Embodiment 1, the amount of red light output in the user's direction increases (0.854→1.124) and the amount of blue light failing to be absorbed by the semiconductor nanocrystal and returning in the direction of the light unit reduces (1.463→1.026).

TABLE 1

|  | Red light | Blue light |
| --- | --- | --- |
| Exemplary Embodiment 1 | 1.124 | 1.026 |
| Comparative Example 1 | 0.854 | 1.463 |

Regarding Exemplary Embodiment 2 and Comparative Example 2, Exemplary Embodiment 2 shows that the thickness ratio of the first scattering layer and the first main color conversion layer of the color conversion layer shown in FIG. 3 is 1:1. Comparative Example 2 shows that the thickness ratio of the first scattering layer and the first main color conversion layer of the color conversion layer shown in FIG. 3 is 1:2.

Referring to Table 2, it is found that, when they have the thickness ratio according to an exemplary embodiment, the amount of red light output in the user's direction increases (0.876→1.058) and the amount of blue light returning in the direction of the light unit reduces (1.441→1.27) according to Exemplary Embodiment 2.

TABLE 2

|  | Red light | Blue light |
| --- | --- | --- |
| Exemplary Embodiment 2 | 1.058 | 1.27 |
| Comparative Example 2 | 0.876 | 1.441 |

Exemplary Embodiment 3 shows that the thickness ratio of the first main color conversion layer and the second scattering layer of the color conversion layer shown in FIG. 4 is 1:1. Comparative Example 3 shows that the thickness ratio of the first main color conversion layer and the second scattering layer of the color conversion layer shown in FIG. 4 is 2:1.

As expressed in Table 3, it is found in Exemplary Embodiment 3 including the color conversion layer with a predetermined thickness ratio, that the outputting amount of red light has increased (0.969→1.165) compared to Comparative Example 3 not satisfying such a numerical range, and the amount of blue light not absorbed by the semiconductor nanocrystal but returning in the direction of the light unit has reduced (1.035→0.769).

TABLE 3

|  | Red light | Blue light |
| --- | --- | --- |
| Exemplary Embodiment 3 | 1.165 | 0.769 |
| Comparative Example 3 | 0.969 | 1.035 |

Referring to FIG. 11, a red light peak ratio represents a ratio for the case when the content of the semiconductor nanocrystal is 30 wt %, and it is a comparison of the amounts of red light output in the user's direction according to the content of the semiconductor nanocrystal. A blue light peak ratio represents a comparison of the amounts of blue light returning in the direction of the light unit according to the content of the semiconductor nanocrystal with reference to the case when the content of the semiconductor nanocrystal is 30 wt %.

As shown in FIG. 11, it is found that the amount of red light output in the user's direction according to the content of the semiconductor nanocrystal included in the color conversion layer is different from the amount of blue light scattered in the direction of the light unit and not used in color conversion.

In detail, it is found that, when the content of the semiconductor nanocrystal is greater than about 30 wt %, the amount of red light output in the user's direction increases. For example, it is known that, when the content of the semiconductor nanocrystal increases to about 50 wt % from about 30 wt %, the increase of the output amount of light reaches about 20%. Further, it is found that the increasing effect of the amount of light is about 20% up to the case when the content of the semiconductor nanocrystal is about 60 wt %. However, it is found that the outputting light efficiency reduces when the content of the semiconductor nanocrystal becomes greater than about 60 wt %.

In addition, regarding the change of the amount of blue light according to the content of the semiconductor nanocrystal, it is found that, as the content of the semiconductor nanocrystal included in the color conversion layer increases, the amount of blue light not absorbed by the semiconductor nanocrystal but moving in the direction of the light unit reduces. It is found that the blue light reflected in the direction of the light unit on the color conversion display panel gradually reduces with reference to the case in which the content of the semiconductor nanocrystal is about 30 wt %.

When they are combined and the content of the semiconductor nanocrystal is greater than about 30 wt %, particularly about 40 to 60 wt %, the blue light is converted into red light, and the amount of light output in the user's direction may increase. Further, within the above-noted range, the amount of blue light not absorbed by the semiconductor nanocrystal but output in the direction of the light unit by a scatterer may reduce. Therefore, the color conversion layer with the above-noted content may increase the light efficiency of converting blue light into red light, and the amount of light output.

A change of the amount of red light and blue light according to a change of the content of the scatterer included in the color conversion layer will now be described with reference to FIG. 12.

Referring to FIG. 12, it is found that, as the content of the scatterer included in the color conversion layer increases, the amount of red light output in the user's direction reduces and the amount of blue light reflected in the direction of the light unit increases with reference to the case in which the content of the semiconductor nanocrystal included in the color conversion layer is about 50 wt %.

The color conversion display panel and the display device including the same have to have a large amount of red light output in the user's direction and a small amount of blue light reflected in the direction of the light unit, so it is found that the scatterer according to an exemplary embodiment has to be included at equal to or less than about 12 wt % according to FIG. 12.

To sum up, the color conversion layer according to an exemplary embodiment includes the semiconductor nanocrystal of the content about 40 to 60 wt % and includes the scatterer of the content that is equal to or less than about 12 wt %, so it is found that the amount of light output in the user's direction may increase.

A light outputting ratio at a pixel area outputting green light will now be described with reference to FIG. 13 to FIG. 15 in a similar manner of the above-described FIG. 10 to FIG. 12. Test conditions and results similar to those with reference to FIG. 10 to FIG. 12 will not be described.

Referring to FIG. 13, Exemplary Embodiment 1 is a color conversion display panel of FIG. 2, Exemplary Embodiment 2 is a color conversion display panel of FIG. 3, Exemplary Embodiment 3 is a color conversion display panel of FIG. 4, and Comparative Example is a color conversion display panel with a single color conversion layer including the semiconductor nanocrystal and a scatterer.

Regarding FIG. 10, the amount of blue light when the blue light input to the color conversion display panel returns by a scatterer is measured, and the amount of green light when the blue light input to the color conversion display panel is converted by the semiconductor nanocrystal and is output in the user's direction (outside of the substrate) is measured.

In the graph of FIG. 13, an x axis is a wavelength band of output light, and a y axis represents a ratio of the amount of output light according to an exemplary embodiment vs. Comparative Example.

As shown in FIG. 13, it is found that the wavelength band of green light (500 nm to 600 nm) according to Exemplary Embodiments 1 to 3 has output a greater amount of green light than that of Comparative Example, and it is found that a very much lesser amount of blue light is detected in the wavelength band of blue light (400 to 500 nm) according to Exemplary Embodiments 1 to 3 compared to Comparative Example.

That is, it is found that much more green light is output in the incident direction to the user in Exemplary Embodiments compared to Comparative Example. Further, it is found that the amount of light that is not converted into green light but returns in the direction of the light unit by the scatterer reduces, which means that a greater amount of light is converted into green light from blue light and the green light is then output, compared to Comparative Example.

A light outputting efficiency of a color conversion display panel according to an exemplary embodiment will now be described with reference to Table 4 to Table 6.

Exemplary Embodiment 1 shows a green pixel in which the thickness of the first scattering layer and the second scattering layer is 1.5 µm and the thickness of the first main color conversion layer is 3 µm in the color conversion display panel according to an exemplary embodiment of FIG. 2. Comparative Example 1 shows a green pixel in which the thickness of the first scattering layer and the second scattering layer is 3 µm and the thickness of the first main color conversion layer is 6 µm in the color conversion display panel according to an exemplary embodiment of FIG. 2.

Regarding Exemplary Embodiment 1 and Comparative Example 1, the measured amounts of green light and blue light are expressed in Table 4 with reference to the amounts of the green light output in the user's direction and the blue light returning in the direction of the light unit on the color conversion layer with a single-layered structure including a semiconductor nanocrystal and a scatterer.

Referring to Table 4, it is found that, when a predetermined thickness is satisfied according to Exemplary Embodiment 1, the amount of green light output in the user's direction increases (0.888→1.147) and the amount of blue light failing to be absorbed by the semiconductor nanocrystal and returning in the direction of the light unit reduces (1.262→0.941).

TABLE 4

|  | Green light | Blue light |
|---|---|---|
| Exemplary Embodiment 1 | 1.147 | 0.941 |
| Comparative Example 1 | 0.888 | 1.262 |

Regarding Exemplary Embodiment 2 and Comparative Example 2, Exemplary Embodiment 2 shows a green pixel in which the thickness ratio of the first scattering layer and the first main color conversion layer of the color conversion layer shown in FIG. 3 is 1:1. Comparative Example 2 shows a green pixel in which the thickness ratio of the first scattering layer and the first main color conversion layer of the color conversion layer shown in FIG. 3 is 1:2.

Referring to Table 5, it is found that, when they have the thickness ratio according to an exemplary embodiment, the amount of green light output in the user's direction increases (0.930→1.135), and the amount of blue light returning in the direction of the light unit reduces (1.246→1.083) according to Exemplary Embodiment 2.

TABLE 5

|  | Green light | Blue light |
|---|---|---|
| Exemplary Embodiment 2 | 1.135 | 1.083 |
| Comparative Example 2 | 0.930 | 1.246 |

Exemplary Embodiment 3 shows a green pixel in which the thickness ratio of the first main color conversion layer and the second scattering layer of the color conversion layer shown in FIG. 4 is 1:1. Comparative Example 3 shows a green pixel in which the thickness ratio of the first main color conversion layer and the second scattering layer of the color conversion layer shown in FIG. 4 is 2:1.

As expressed in Table 6, it is found in Exemplary Embodiment 3 including the color conversion layer with a predetermined thickness ratio, that the outputting amount of green light has increased (0.944→1.142) compared to Comparative Example 3 not satisfying such a numerical range, and the amount of blue light not absorbed by the semiconductor nanocrystal but returning in the direction of the light unit has reduced (1.026→0.796).

TABLE 6

|  | Green light | Blue light |
|---|---|---|
| Exemplary Embodiment 3 | 1.142 | 0.796 |
| Comparative Example 3 | 0.944 | 1.026 |

Referring to FIG. 14, a green light peak ratio represents a ratio for the case when the content of the semiconductor nanocrystal is 40 wt %, and it is a comparison of the amounts of green light output in the user's direction according to the content of the semiconductor nanocrystal. A blue light peak ratio represents a comparison of the amounts of blue light returning in the direction of the light unit according to the content of the semiconductor nanocrystal with reference to the case when the content of the semiconductor nanocrystal is 40 wt %.

As shown in FIG. 14, it is found that the amount of green light output in the user's direction according to the content of the semiconductor nanocrystal included in the color conversion layer is different from the amount of blue light scattered in the direction of the light unit and not used in color conversion.

In detail, it is found that, when the content of the semiconductor nanocrystal is greater than about 40 wt %, the amount of green light output in the user's direction increases. For example, it is known that, when the content of the semiconductor nanocrystal increases to about 50 wt % from about 30 wt %, the increase of the output amount of light reaches about 30%. However, it is found that the outputting light efficiency reduces when the content of the semiconductor nanocrystal becomes greater than about 50 wt %.

In addition, regarding the change of the amount of blue light according to the content of the semiconductor nanocrystal, it is found that, as the content of the semiconductor nanocrystal included in the color conversion layer increases, the amount of blue light not absorbed by the semiconductor nanocrystal but moving in the direction of the light unit reduces. It is found that the blue light reflected in the direction of the light unit on the color conversion display panel gradually reduces with reference to the case in which the content of the semiconductor nanocrystal is about 40 wt %.

When they are combined and the content of the semiconductor nanocrystal is greater than about 30 wt %, particularly about 40 to 60 wt %, the blue light is converted into green light, and the amount of light output in the user's direction may increase. Further, within the above-noted range, the amount of blue light not absorbed by the semiconductor nanocrystal but output in the direction of the light unit by a scatterer may reduce.

A change of the amount of green light and blue light according to a change of the content of the scatterer included in the color conversion layer will now be described with reference to FIG. 15.

Referring to FIG. 15, it is found that, as the content of the scatterer included in the color conversion layer increases, the amount of green light output in the user's direction reduces and the amount of blue light reflected in the direction of the light unit increases with reference to the case in which the content of the semiconductor nanocrystal included in the color conversion layer is about 40 wt %.

The color conversion display panel and the display device including the same have to have a large amount of green light output in the user's direction and a small amount of blue light reflected in the direction of the light unit, so it is found that the scatterer according to an exemplary embodiment has to be included at equal to or less than about 12 wt %, according to FIG. 15.

To sum up, the color conversion layer according to an exemplary embodiment includes the semiconductor nanocrystal of the content of about 40 to 60 wt % and includes the scatterer of the content that is equal to or less than about 12 wt %, so it is found that the amount of light output in the user's direction may increase.

While the inventive concept has been described in connection with what is presently considered to be practical exemplary embodiments, it is to be understood that the inventive concept is not limited to the disclosed embodiments, but, on the contrary, is intended to cover various modifications and equivalent arrangements included within the spirit and scope of the appended claims.

What is claimed is:

1. A color conversion display panel comprising:
a color conversion layer provided on a substrate; and
a transmission layer provided on the substrate, wherein the color conversion layer includes a red color conversion layer and a green color conversion layer, and
at least one of the red color conversion layer and the green color conversion layer includes:
a scattering layer provided on the substrate and including a scatterer,
a main color conversion layer overlapping the scattering layer and including the scatterer and a semiconductor nanocrystal; and
a light filter layer integrally provided directly on the red color conversion layer, the green color conversion layer, and the transmission layer, and
wherein two faces of the light filter layer respectively cover a first surface and a side surface of the red color conversion layer, the green color conversion layer, and the transmission layer,
the two faces of the light filter layer are not parallel to each other, and
the two faces of the light filter layer are both positioned farther from the substrate than the transmission layer.

2. The color conversion display panel of claim 1, wherein a content of the semiconductor nanocrystal is 40 wt % to 60 wt % of the entire content of the color conversion layer.

3. The color conversion display panel of claim 1, wherein the red color conversion layer includes:
a first scattering layer and a second scattering layer provided on the substrate, and
a first main color conversion layer provided between the first scattering layer and the second scattering layer,
the first scattering layer and the second scattering layer include the scatterer, and the first main color conversion layer includes the scatterer and a first semiconductor nanocrystal.

4. The color conversion display panel of claim 1, wherein the green color conversion layer includes:
a first scattering layer and a second scattering layer provided on the substrate, and
a second main color conversion layer provided between the first scattering layer and the second scattering layer,
the first scattering layer and the second scattering layer include the scatterer, and the second main color conversion layer includes the scatterer and a second semiconductor nanocrystal.

5. The color conversion display panel of claim 1, wherein the scattering layer has a thickness of 1 to 2 μm, and the main color conversion layer has a thickness of 2 to 4 μm.

6. The color conversion display panel of claim 1, wherein the red color conversion layer includes:
a first main color conversion layer including a first semiconductor nanocrystal and the scatterer, and
a first scattering layer provided between the first main color conversion layer and the substrate and including the scatterer, and
the green color conversion layer includes:
a second main color conversion layer including a second semiconductor nanocrystal and the scatterer, and
a second scattering layer provided between the second main color conversion layer and the substrate and including the scatterer.

7. The color conversion display panel of claim 6, wherein a thickness ratio of the first main color conversion layer and the first scattering layer is equal to or greater than 1:2 and equal to or less than 2:1, and a thickness ratio of the second main color conversion layer and the second scattering layer is equal to or greater than 1:2 and equal to or less than 2:1.

8. The color conversion display panel of claim 1, wherein the red color conversion layer includes:
a first main color conversion layer including a first semiconductor nanocrystal and the scatterer, and
a first scattering layer provided on the first main color conversion layer and including the scatterer, and
the green color conversion layer includes:
a second main color conversion layer including a second semiconductor nanocrystal and the scatterer, and
a second scattering layer provided on the second main color conversion layer and including the scatterer.

9. The color conversion display panel of claim 8, wherein
a thickness ratio of the first main color conversion layer and the first scattering layer is equal to or greater than 1:2 and equal to or less than 2:1, and a thickness ratio of the second main color conversion layer and the second scattering layer is equal to or greater than 1:2 and equal to or less than 2:1.

10. The color conversion display panel of claim 1, wherein the semiconductor nanocrystal is included at greater than 30 wt % of an entire content of the color conversion layer.

11. The color conversion display panel of claim 1, wherein the scatterer is included at greater than 10 wt % and equal to or less than 12 wt % of the entire content of the color conversion layer.

12. The color conversion display panel of claim 1, wherein the scatterer includes at least one of $SnO_2$, and $Sb_2O_3$.

13. The color conversion display panel of claim 1, wherein the light filter layer includes a least one layer formed of at least one of TiN, AlN, $SnO_2$, and $WO_3$.

14. A color conversion display panel comprising:
a red color conversion layer and a green color conversion layer provided on a substrate and including a semiconductor nanocrystal and a scatterer;
a transmission layer provided on the substrate; and
a blue cutting filter provided between the red color conversion layer and the substrate and between the green color conversion layer and the substrate,
wherein the blue cutting filter includes a first region overlapping the red color conversion layer and a second region overlapping the green color conversion layer, and the first region and the second region are connected to each other,
wherein at least one of the red color conversion layer and the green color conversion layer includes:
a first scattering layer and a second scattering layer provided on the substrate, and
a main color conversion layer provided between the first scattering layer and the second scattering layer,
wherein the first scattering layer, the second scattering layer, and the main color conversion layer include the scatterer, and the main color conversion layer further includes the semiconductor nanocrystal; and
a light filter layer integrally provided on the red color conversion layer, the green color conversion layer, and the transmission layer, and
wherein the light filter layer covers a first surface and a side surface of the red color conversion layer, the green color conversion layer, and the transmission layer,
the first surface and the side surface are not parallel to each other, and
the main color conversion layer is positioned between the light filter layer and the blue cutting filter.

15. The color conversion display panel of claim 14, wherein
the semiconductor nanocrystal is included at greater than 30 wt % of an entire content of the color conversion layer,
wherein the scatterer is included at greater than 10 wt % and equal to or less than 12 wt % of the entire content of at least one of the red color conversion layer and the green color conversion layer.

16. The color conversion display panel of claim 15, wherein
the semiconductor nanocrystal is included at 40 to 60 wt % of the entire content of the color conversion layer.

17. The color conversion display panel of claim 14, wherein
each thickness of the first scattering layer and the second scattering layer is 1 to 2 μm, and each thickness of the first main color conversion layer and the second main color conversion layer is 2 to 4 μm.

18. The color conversion display panel of claim 14, wherein the light filter layer includes a least one layer formed of at least one of TiN, AlN, $SnO_2$, and $WO_3$.

19. A display device comprising:
a thin film transistor array panel; and
a color conversion display panel overlapping the thin film transistor array panel,
wherein the color conversion display panel includes:
a color conversion layer provided between a substrate and the thin film transistor array panel and including a semiconductor nanocrystal and a scatterer, and
a transmission layer provided between the substrate and the thin film transistor array panel and including the scatterer, wherein
the color conversion layer includes a red color conversion layer and a green color conversion layer, and
at least one of the red color conversion layer and the green color conversion layer includes:
a main color conversion layer overlapping the scattering layer and including the scatterer and the semiconductor nanocrystal; and
a light filter layer integrally provided directly on the red color conversion layer, the green color conversion layer, and the transmission layer, and
wherein two faces of the light filter layer respectively cover a first surface and a side surface of the red color conversion layer, the green color conversion layer, and the transmission layer,
the two faces of the light filter layer are not parallel to each other, and
the two faces of the light filter layer are both positioned farther from the substrate than the transmission layer.

20. The display device of claim 19, wherein
the red color conversion layer includes:
a first scattering layer and second scattering layer provided between the substrate and the thin film transistor array panel and including the scatterer, and
a first main color conversion layer provided between the first scattering layer and the second scattering layer and including the scatterer and a first semiconductor nanocrystal, and
the green color conversion layer includes:
the first scattering layer and the second scattering layer provided between the substrate and the thin film transistor array panel and including the scatterer, and
a second main color conversion layer provided between the first scattering layer and the second scattering layer and including the scatterer and a second semiconductor nanocrystal.

21. The display device of claim 19, wherein the red color conversion layer includes:
a first main color conversion layer including a first semiconductor nanocrystal, and
a first scattering layer provided between the first main color conversion layer and the substrate, and
the green color conversion layer includes:
a second main color conversion layer including a second semiconductor nanocrystal, and
a second scattering layer provided between the second main color conversion layer and the substrate.

22. The display device of claim 21, wherein
a thickness ratio of the first scattering layer and the first main color conversion layer is equal to or greater than 1:2 and equal to or less than 2:1, and a thickness ratio of the second scattering layer and the second main color conversion layer is equal to or greater than 1:2 and equal to or less than 2:1.

23. The display device of claim 19, wherein
the red color conversion layer includes:
a first main color conversion layer including a first semiconductor nanocrystal and the scatterer, and
a first scattering layer provided between the first main color conversion layer and the thin film transistor array panel and including the scatterer, and
the green color conversion layer includes:
a second main color conversion layer including a second semiconductor nanocrystal and the scatterer, and
a second scattering layer provided between the second main color conversion layer and the thin film transistor array panel and including the scatterer.

24. The display device of claim 23, wherein
a thickness ratio of the first main color conversion layer and the first scattering layer is equal to or greater than 1:2 and equal to or less than 2:1, and a thickness ratio of the second main color conversion layer and the second scattering layer is equal to or greater than 1:2 and equal to or less than 2:1.

25. The display device of claim 19, wherein
the semiconductor nanocrystal is included at 40 to 60 wt % of an entire content of the color conversion layer,
the scatterer is included at greater than 10 wt % and equal to or less than 12 wt % of the entire content of the color conversion layer,
the scatterer includes at least one of $SnO_2$, and $Sb_2O_3$, and
the light filter layer includes at least one layer formed of at least one of TiN, AlN, $SnO_2$, and $WO_3$.

* * * * *